United States Patent
Ragan et al.

(10) Patent No.: US 6,758,080 B1
(45) Date of Patent: Jul. 6, 2004

(54) CALIBRATION OF SENSORS

(75) Inventors: Glen Ragan, Sugar Land, TX (US); David Wilson, Missouri City, TX (US); Jeffrey C. Gannon, Houston, TX (US); Hai T. Pham, Sugar Land, TX (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 09/914,422

(22) PCT Filed: Mar. 8, 2000

(86) PCT No.: PCT/US00/06032
§ 371 (c)(1),
(2), (4) Date: Nov. 14, 2001

(87) PCT Pub. No.: WO00/55652
PCT Pub. Date: Sep. 21, 2000

Related U.S. Application Data
(60) Provisional application No. 60/125,076, filed on Mar. 17, 1999.

(51) Int. Cl.[7] ................................................ G05B 19/42
(52) U.S. Cl. ....................................................... 73/1.38
(58) Field of Search ................................ 73/1.37–1.39, 73/1.85

(56) References Cited

U.S. PATENT DOCUMENTS

| | | |
|---|---|---|
| 4,188,816 A | 2/1980 | Mairson |
| 4,616,320 A | 10/1986 | Kerr et al. |
| 5,574,211 A | 11/1996 | Shimada et al. |
| 5,596,322 A | 1/1997 | Marsh et al. |
| 5,644,067 A | 7/1997 | Gabrielson .................. 73/1.39 |
| 5,834,623 A | 11/1998 | Ignagni |
| 6,209,383 B1 * | 4/2001 | Mueller et al. .............. 73/1.37 |

FOREIGN PATENT DOCUMENTS

| | | |
|---|---|---|
| DE | 19710217 C1 | 10/1998 |
| WO | WO98/12577 | 3/1998 |

OTHER PUBLICATIONS

IEEE Std. 337–1972; IEEE Standard Specification Format Guide and Test Procedure for Linear, Single–Axis, Pendulous, Analog Torque Balance Accelerometer; Dec. 2, 1971 (pp. 8–53).

* cited by examiner

Primary Examiner—Robert Raevis
(74) Attorney, Agent, or Firm—Madan, Mossman & Sriram, P.C.

(57) ABSTRACT

A plurality of seismic sensors calibration method (100) includes: an assembling so that sensors are coupled with each sensor positioned with its axis of sensitivity in a different spatial direction calibration system step (105), a rotating sensors step (110), a measuring sensors output signals step (115), a sensor output signal processing step (120) and a storing calibration coefficient(s) step (125).

9 Claims, 6 Drawing Sheets

CALIBRATION OF SENSORS

This application claims benefit of application No. 60/125,076 filed Mar. 17, 1999.

BACKGROUND OF THE INVENTION

The present disclosure relates generally to a method of calibrating a plurality of sensors, and in particular to a three-axis sensor.

In deploying sensors, calibration coefficients are used to correct the sensors for variations or errors in gain, offset, non-linearity, misalignment of the proof masses, cross-axis coupling, temperature, or other environmental factors and to provide more accurate seismic data. Some limitations of current calibration methods include no automatic calibration, no conversion of data to internationally accepted scientific units, no permanent storage of the data, and no universal usage by any and all seismic software.

The present invention is directed to overcoming or at least minimizing some of the limitations of the existing methods of calibrating sensors.

SUMMARY OF THE INVENTION

According to one aspect of the invention, a method of calibrating a plurality of seismic sensors, each sensor having an axis of sensitivity, is provided that includes: coupling the sensors with each sensor positioned with its axis of sensitivity in a different spatial direction; rotating the sensors; measuring one or more output signals from the sensors; processing the output signals from the sensors; and storing one or more calibration coefficients.

DETAILED DESCRIPTION OF THE ILLUSTRATIVE EMBODIMENTS

Several embodiments of a method for calibrating a plurality of sensors are provided. The sensors are calibrated to correct for variations or errors in gain, offset, non-linearity, misalignment of the proof masses, cross-axis coupling, temperature, or other environmental factors and to provide more accurate seismic data. In a preferred embodiment, a system for calibration includes a plurality of sensors and a controller. The sensors are calibrated by rotating the sensors, obtaining data from the sensors, calculating the calibration coefficients for the sensors, and storing the calibration coefficients. The controller gathers the sensor data and calculates the calibration coefficients. The controller preferably includes a computer data acquisition system and a computer software program.

Figure 1:
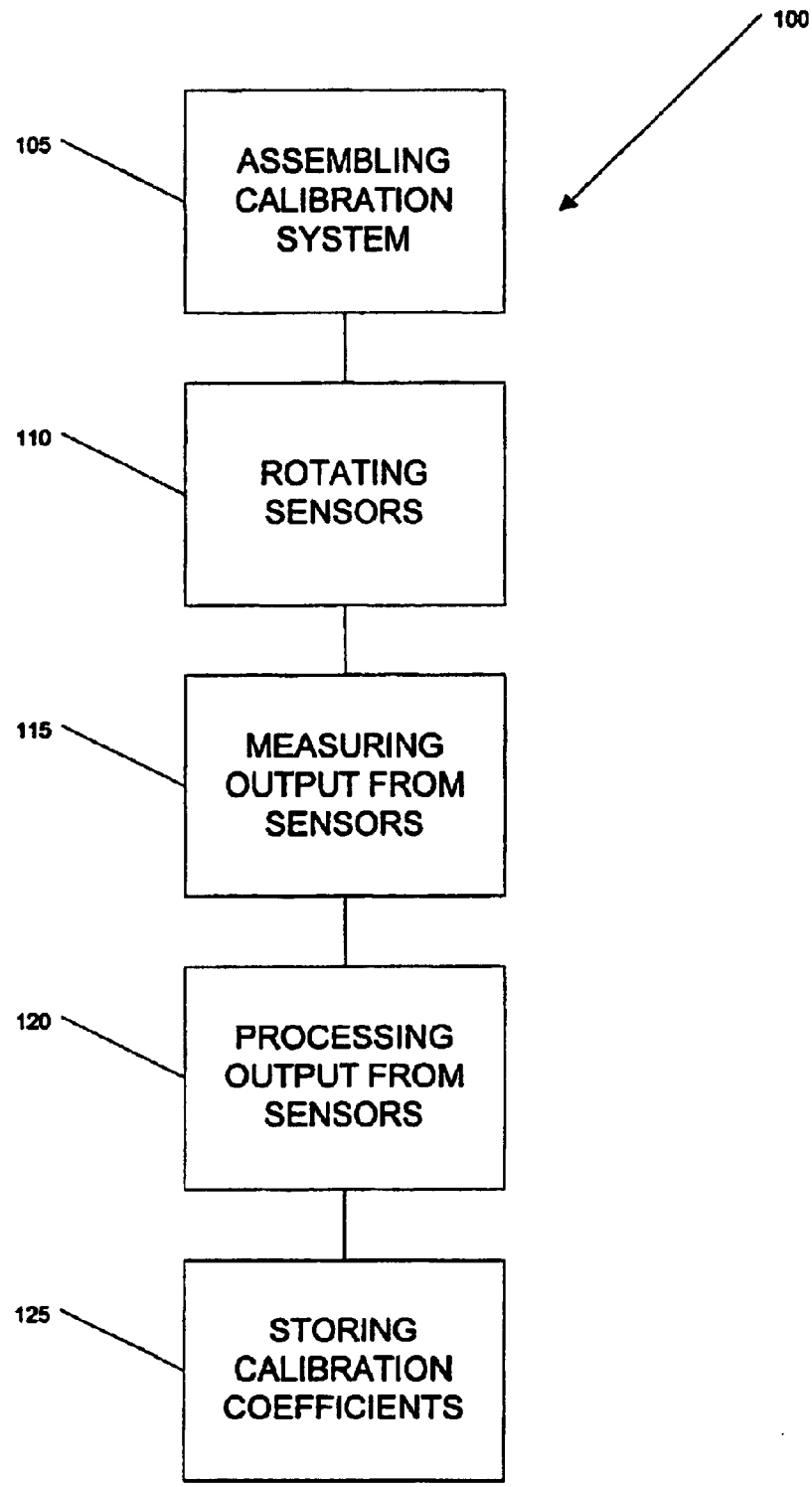
FIG. 1 is a block diagram illustrating an embodiment of a method for calibrating a plurality of sensors.

Referring initially to FIG. 1, a preferred embodiment of a method 100 for calibrating a plurality of seismic sensors includes: (1) assembling a calibration system in step 105; (2) rotating the sensors in step 110; (3) measuring output from the sensors in step 115; (4) processing output from the sensors in step 120; and (5) storing one or more calibration coefficients in step 125. In a preferred embodiment, the steps 105, 110, 115, and 120 of the method 100 preferably incorporate the methods disclosed in the Institute of Electrical and Electronic Engineers Specification IEEE 337-1972 for the IEEE Standard Specification Format Guide and Test Procedure for Linear, Single-Axis, Pendulous, Analog Torque Balance Acclerometer, attached as Appendix A.

Figure 2A:
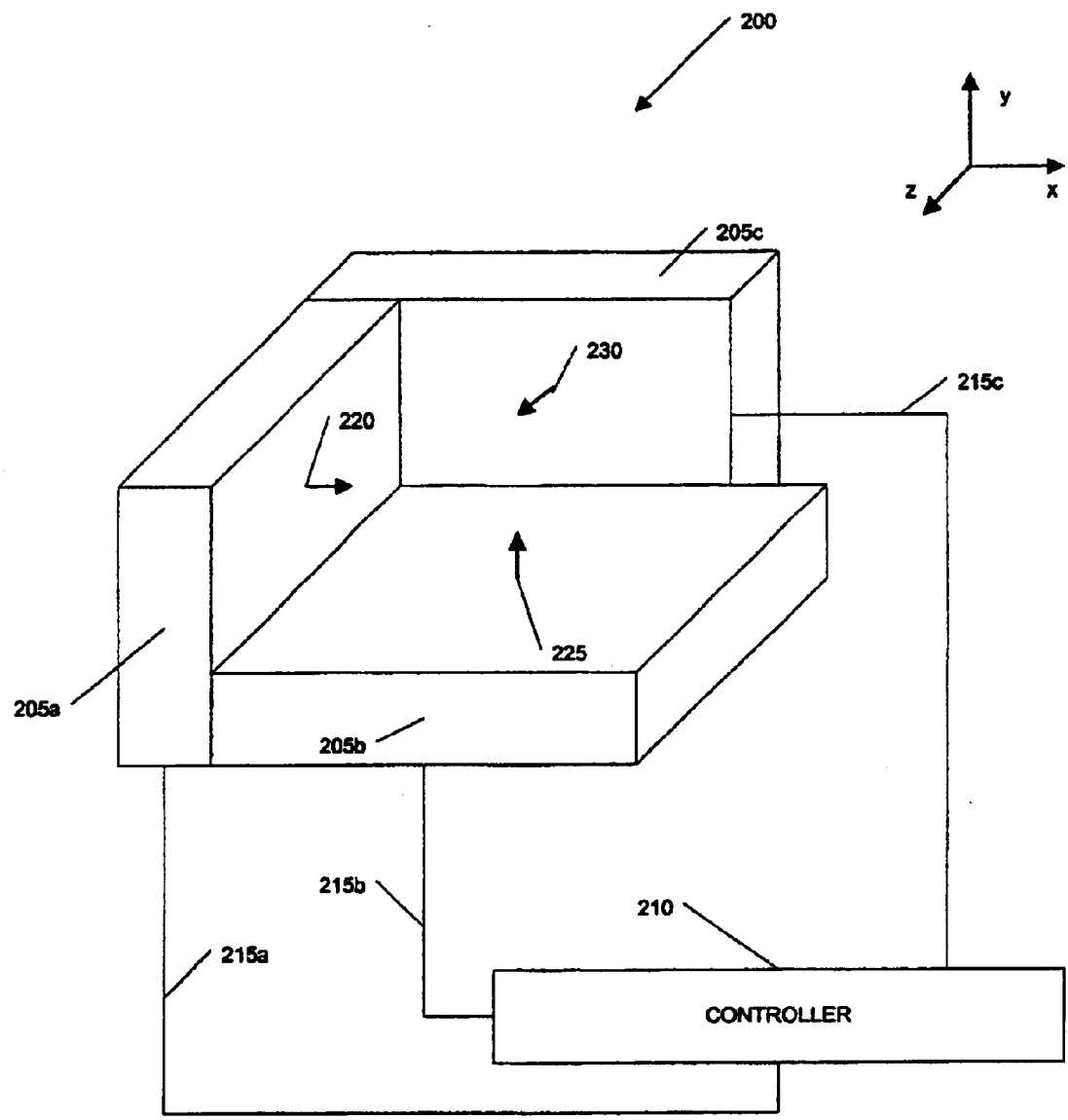
FIG. 2A is a schematic view of an embodiment of a calibration system for use in the method of FIG. 1.

Referring to FIG. 2A, in step 105, a calibration system 200 preferably includes a plurality of sensors 205 and a controller 210. In a preferred embodiment, the calibration system 200 includes a first sensor 205a, a second sensor 205b, and a third sensor 205c. The sensors 205 are preferably coupled to the controller 210 by one or more communication interfaces 215. In a preferred embodiment, the calibration system 200 includes a first communication interface 215a, a second communication interface 215b, and a third communication interface 215c. The first sensor 205a is preferably coupled to the controller 210 by the first communication interface 215a. The second sensor 205b is preferably coupled to the controller 210 by the second communication interface 215b. The third sensor 205c is preferably coupled to the controller 210 by the third communication interface 215c. The communication interfaces 215 may, for example, be parallel. In a preferred embodiment, the communication interfaces 215 are serial in order to optimally provide reduced wiring complexity.

The first sensor 205a preferably includes an axis of sensitivity 220. The axis of sensitivity 220 is preferably approximately parallel to the x-axis. The first sensor 205a is preferably coupled to the second sensor 205b and the third sensor 205c to maintain the axis of sensitivity 220 parallel to the x-axis. The second sensor 205b preferably includes an axis of sensitivity 225. The axis of sensitivity 225 is preferably approximately parallel to the y-axis. The second sensor 205b is preferably coupled to the first sensor 205a and the third sensor 205c to maintain the axis of sensitivity 225 parallel to the y-axis. The third sensor 205c preferably includes an axis of sensitivity 230. The axis of sensitivity 230 is preferably approximately parallel to the z-axis. The third sensor 205c is preferably coupled to the first sensor 205a and the second sensor 205b to maintain the axis of sensitivity 230 parallel to the z-axis. More generally, the axis of sensitivity 220 is in a first direction, the axis of sensitivity 225 is in a second direction, and the axis of sensitivity 230 is in a third direction and the directions need not be orthogonal to one another when the sensors 205 are coupled.

Figure 2B:
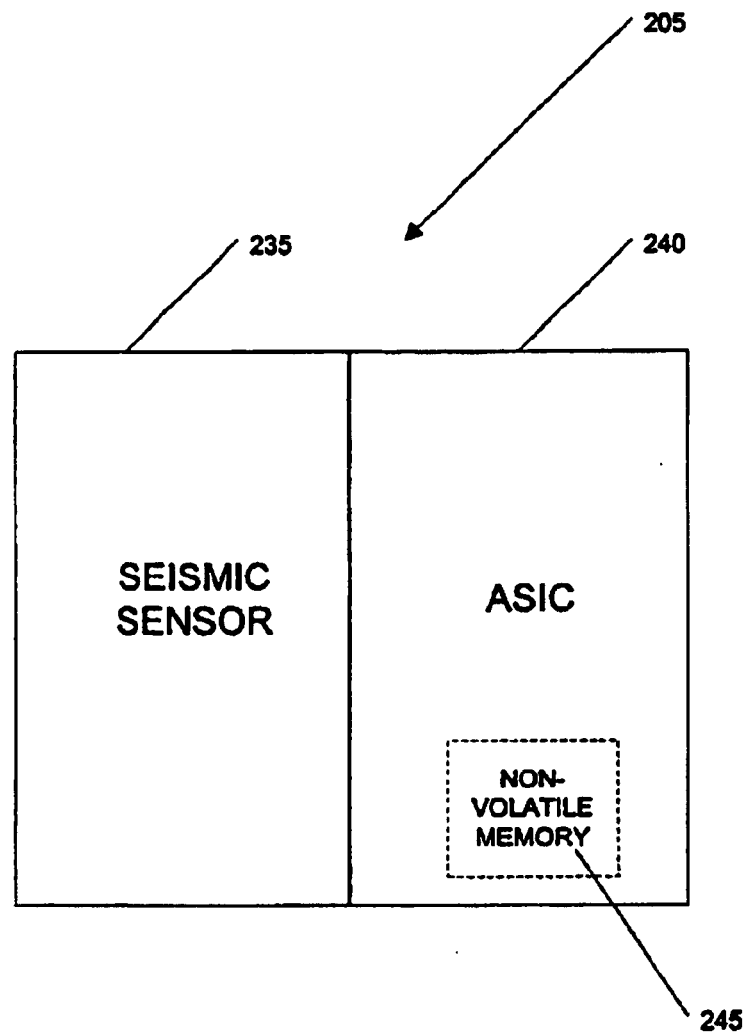
FIG. 2B is a schematic view of an embodiment of the sensors of the calibration system of FIG. 2A.

Referring to FIG. 2B, each of the sensors 205 preferably include a seismic sensor 235 and an application specific integrated circuit ("ASIC") 240. The design and operation of the seismic sensor 235 and the ASIC 240 are preferably substantially as disclosed in the following co-pending U.S. patent application Ser. No. 09/936,640, filed on Sep. 12, 2001, Ser. No. 09/936,634, filed on Sep. 12, 2001, and Ser. No. 08/935,093, filed on Sep. 25, 1997, the contents of which are incorporated herein by reference. The ASIC 240 preferably further includes a local non-volatile memory 245. The local non-volatile memory 245 may be, for example, PROM, EPROM, EEPROM, flash memory or traditional NVM. In a preferred embodiment, the local non-volatile memory 245 is EEPROM in order to optimally provide permanent reprogrammable data storage.

Figure 2C:
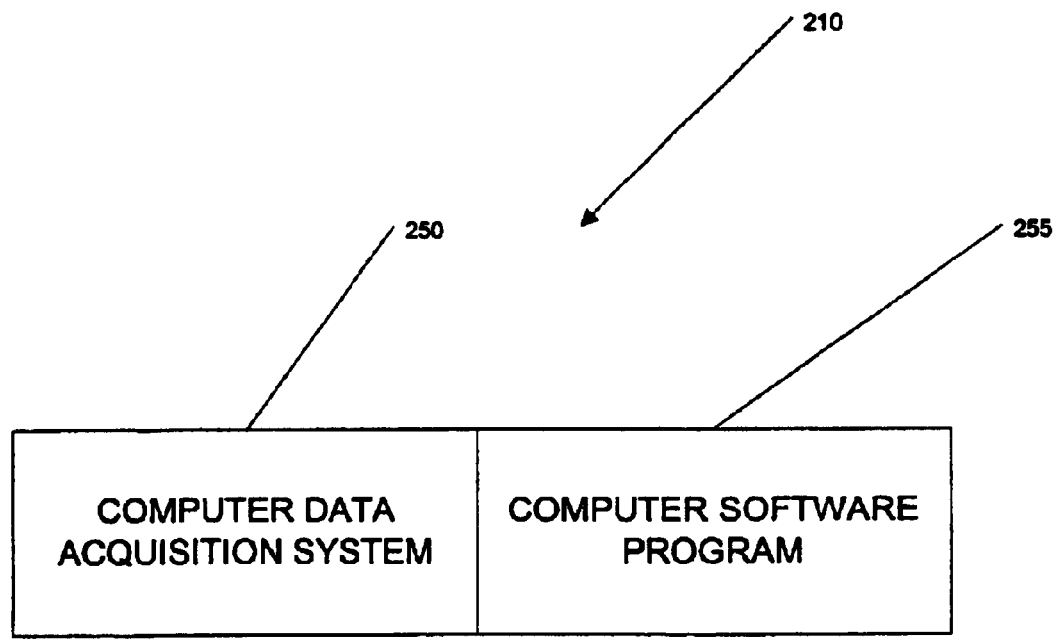
FIG. 2C is a schematic view of an embodiment of the controller of the calibration system of FIG. 2A.

Referring to FIG. 2C, the controller 210 preferably includes a computer data acquisition system 250 and a computer software program 255. The controller 210 may, for example, be a mechanical fixture and a PC. In a preferred embodiment, the controller 210 is a motor driven rotation stage in order to optimally provide better repeatability and automation in the method 100. The computer data acquisition system 250 may, for example, be a voltmeter. In a preferred embodiment, the computer data acquisition system 250 is PC-based using counter A/D, D/A and digital I/O boards in order to optimally provide automation. The computer software program 255 may be, for example, C code. In a preferred embodiment the computer software program 255 is a commercial package utilizing graphical user interfaces in order to optimally provide ease of programming, debugging and usage.

Figure 3:
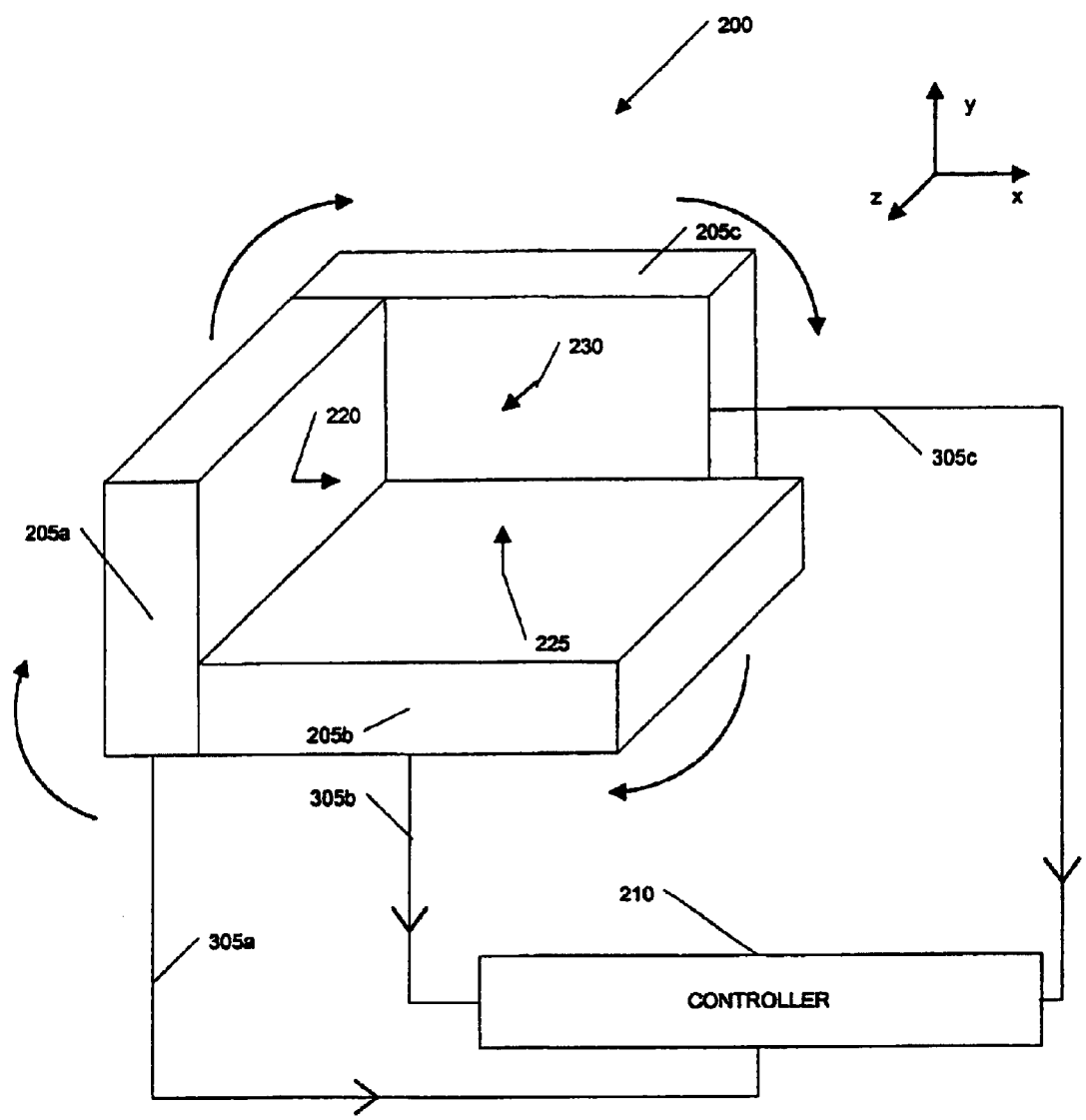
FIG. 3 is a schematic view of rotating the sensors and measuring output from the sensors of the calibration method of FIG. 1.

Referring to FIG. 3, in step 110, the sensors 205 are preferably rotated around the x-axis, the y-axis and the z-axis. The sensors 205 may, for example, be rotated at angle increments ranging from about 30 to 90 degrees. In a preferred embodiment, the sensors 205 are rotated at angle increments ranging from about 45 to 90 degrees in order to optimally provide the minimum required accuracy.

In step 115, the sensors 205 preferably transmit one or more output signals 305 to the computer data acquisition system 250 of the controller 210 as the corresponding sensors 205 are rotated. In a preferred embodiment, a first output signal 305a, a second output signal 305b, and a third output signal 305c are transmitted from the first sensor 205a, the second sensor 205b, and the third sensor 205c, respectively. The computer data acquisition system 250 of the controller 210 preferably stores the output signals 305 from the corresponding sensors 205. The output signals 305 are preferably measured at each angle the corresponding sensors 205 are rotated about in step 110.

Figure 4:
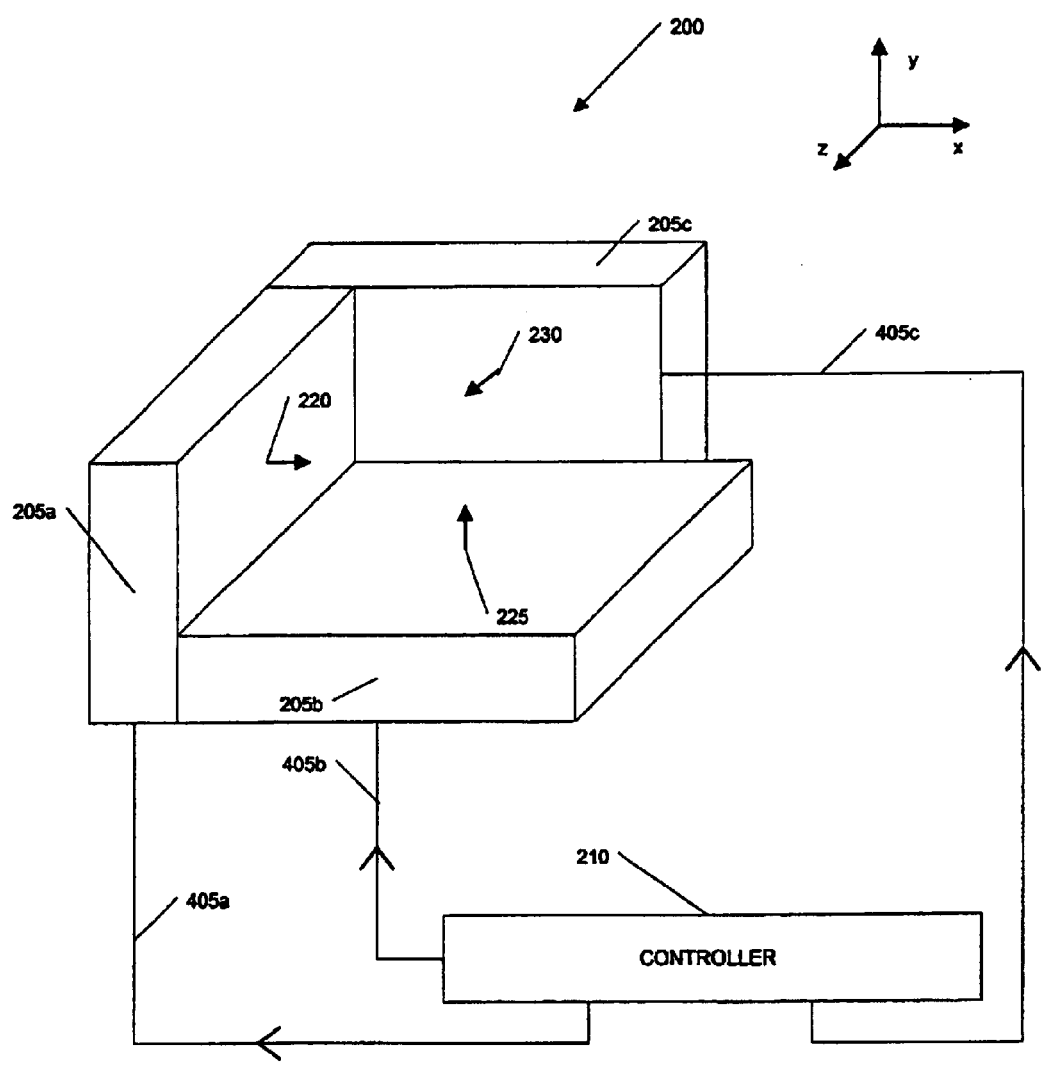
FIG. 4 is a schematic view of a preferred embodiment for processing output from the sensors and storing calibration coefficients to the sensors of the calibration method of FIG. 1.
Figure 3:
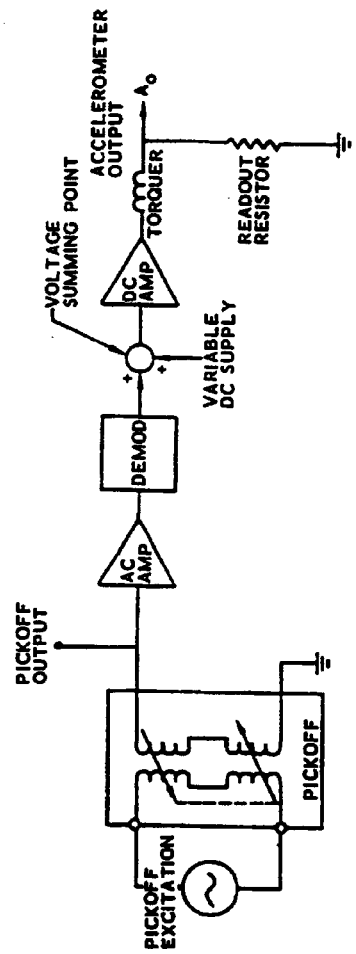

Referring to FIG. 4, in step 120, the output signals 305 from the corresponding sensors 205 are preferably processed by the computer software program 255 of the controller 210. The computer software program 255 of the controller 210 preferably calculates one or more calibration coefficients 405 from the outputs 305 of the sensors 205. In a preferred embodiment, a first calibration coefficient 405a, a second calibration coefficient 405b, and a third calibration coefficient 405c are generated for the first sensor 205a, the second sensor 205b, and the third sensor 205c, respectively, to the controller 210.

In step 125, the calibration coefficients 405 are stored. The calibration coefficients may be stored, for example, in the local non-volatile memory 245 or an external database. In a preferred embodiment, the calibration coefficients are stored in the local non-volatile memory 245 of the corresponding sensor 205 in order to optimally provide storage of data in the calibrated unit. The first calibration coefficient 405a, the second calibration coefficient 405b, and the third calibration coefficient 405c are preferably downloaded to the first sensor 205a, the second sensor 205b, and the third sensor 205c, respectively.

A method of calibrating a plurality of seismic sensors, with each sensor having an axis of sensitivity, has been described that includes coupling the sensors, with each sensor positioned with its axis of sensitivity in a different spatial direction, rotating the sensors, measuring the output signals from the sensors, processing the output signals from the sensors, and storing one or more calibration coefficients. In a preferred embodiment, the sensors comprise micromachined accelerometers. In a preferred embodiment, coupling the sensors with each sensor positioned with its axis of sensitivity in a different spatial direction includes coupling the sensors with the axes of sensitivity in the x-direction, the y-direction, and the z-direction. In a preferred embodiment, rotating the sensors includes rotating the sensors about the x-axis, the y-axis and the z-axis. In a preferred embodiment, measuring output from the sensors includes measuring the output signals from the sensors at one or more angles of rotation. In a preferred embodiment, processing output from the sensors includes calculating one or more calibration coefficients from the measured output signals of the sensors. In a preferred embodiment, each sensor further includes a corresponding ASIC having a local non-volatile memory. In a preferred embodiment, storing one or more calibration coefficients to the sensors includes storing the corresponding calibration coefficients to the corresponding local non-volatile memories in the corresponding ASIC. In a preferred embodiment, storing one or more calibration coefficients to the sensors includes storing the corresponding calibration coefficients to an external database. In a preferred embodiment, coupling, rotating, measuring, and processing are provided in accordance with the Institute of Electrical and Electronic Engineers Specification IEEE 337-1972 for the IEEE Standard Specification Format Guide and Test Procedure for Linear, Single-Axis, Pendulous, Analog Torque Balance Acclerometer.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

APPENDIX A

IEEE Standard Specification Format Guide and Test Procedure for Linear, Single-Axis, Pendulous, Analog Torque Balance Acclerometer

WO 00/55652

PCT/US00/06032

8

IEEE Standard Specification Format Guide and Test Procedure for Linear, Single-Axis, Pendulous, Analog Torque Balance Accelerometer Sponsor
Gyro and Accelerometer Panel of the
IEEE Aerospace Electronics Systems Group \* Copyright 1971 by The Institute of Electrical and Electronics Engineers, Inc.

*No part of this publication may be reproduced in any form,
in an electronic retrieval system or otherwise,
without the prior written permission of the publisher.*

9
IEEE Standards Committee

B. B. Barrow, *Chairman*

J. Forster, *Vice Chairman*         S. I. Sherr, *Secretary*

| | | |
|---|---|---|
| S. J. Angello | J. A. Goetz | R. H. Ross, II |
| E. C. Barnes | A. D. Hasley | S. V. Soanes |
| F. K. Becker | G. E. Hertig | L. Van Rooij |
| W. H. Cook | A. R. Hileman | R. V. Wachter |
| W. H. Devenish | H. Lance | B. O. Weinschel |
| C. J. Essel | D. T. Michael | C. E. White |
| R. F. Estoppey | J. B. Owens | W. T. Wintringham |

For word (This Foreword is not a part of IEEE Std 337-1972, Specification Format Guide and Test Procedure for Linear, Single-Axis, Pendulous, Analog Torque Balance Accelerometer.)

This standard was prepared by th Gyro and Accelerometer Panel of the Aerospace Electronics Systems Group of the Institute of Electrical and Electronics Engineers. It consists of two parts.

Part I is a specification format guide for the preparation of an accelerometer specification. It provides a common meeting ground of terminology and practice for manufacturers and users. The user is cautioned not to overspecify; only those parameters that are required to guarantee proper instrument performance in the specific application should be controlled. In general, the specification should contain only those requirements that can be verified by test or inspection. Parameters in addition to those given in this standard are not precluded. Appendix A presents a discussion of the dynamic response of the instrument when operating in either the open or the closed loop mode. Figures 1, 2, A1 and A2 are to be used as a guide for the preparation of specific figures or drawings.

Part II is a compilation of recommended procedures for testing an accelerometer. Thes procedures, including test conditions to be considered, are derived from those currently in use. For a specific application, the test procedure should reflect the requirements of the specifications; therefore, not all tests outlined in this document need be included, nor are additional tests precluded. In some cases, alternative methods for measuring performance characteristics have been included or indicated.

Blank spaces in the text of this document permit the insertion of specific parameter values and their tolerances. Brackets are used to enclose alternative choices of dimensional units, signs, axes, etc. Boxed statements are included for information only and are not part of the specification or test procedures.

The symbols used conform to IEEE Std 260-1967, Letter Symbols for Units Used in Electrical Science and Electrical Engineering. In this document, the symbol $g$ is used to denote a unit of acceleration equal in magnitude to the local value of gravity at the test site or other specified value of gravity. This symbol is thus distinguished from g, which is the letter symbol for gram. The user should note that the forcing function for most of the tests described in this document is the local gravity vector. Since the magnitude of the gravity vector varies with location, it is necessary to normalize the measured coefficients to a selected standard value of $g$ when comparing data obtained at different test locations. The attractive force of gravity acting on the proof mass of an earth-bound accelerometer is equivalent in effect to the inertia or reaction force due to an upward acceleration of one $g$.

The accelerometer considered in this document is a linear, single-axis, non-gyroscopic, analog torque balance, pendulous accelerometer with permanent magnet torquer. Refer to Ac celerometer System Diagram on the next page. The analog electronics of the torque balance capture loop are considered to be part of the test equipment. The accelerometer is normally used as a sensing element to provide an electrical signal proportional to acceleration. An acceleration applied along the input axis causes the proof mass to deflect. The pickoff error signal caused by this motion is utilized in the capture loop to produce a restoring torque. When static equilibrium is reached, the reaction force of the proof mass to acceleration is exactly balanced by the restoring torque. The current required by the torquer to maintain this equilibrium condition is approximately proportional to the applied acceleration, and provides the accelerometer output.

The IEEE will maintain this document current with the state of the technology. Comments are invited on this document as are suggestions for additional material. These should be addressed to:

Secretary
IEEE Standards Committee
The Institute of Electrical and
  Electronics Engineers, Inc.
345 East 47 Street
New York, N. Y. 10017

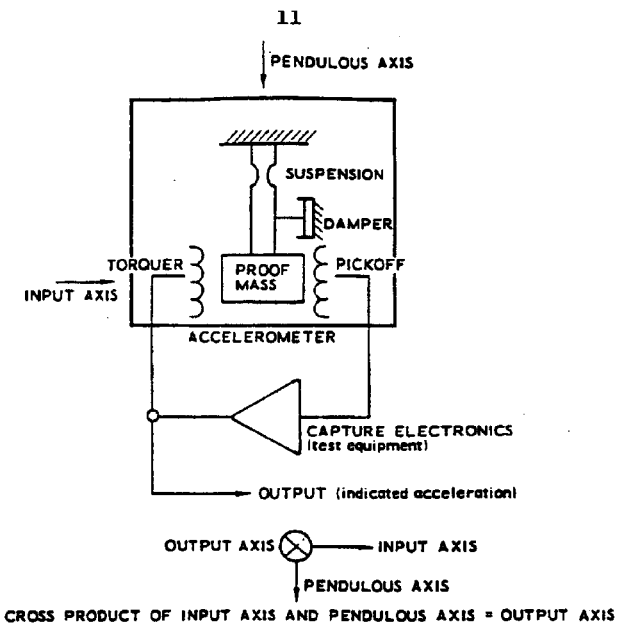

Accelerometer System Diagram

The major contributors to this document were the following:

A. T. Campbell, Chairman, 1965
A. M. Leeking, Chairman, 1966
R. B. Clark, Chairman, 1967

C. O. Swanson, Chairman, 1968
H. A. Dinter, Chairman, 1969
N. F. Sinnott, Chairman, 1970

M. D. Mobley, Chairman, 1971

| | | |
|---|---|---|
| W. E. Bachman | H. L. Gubbins | G. H. Neugebauer |
| C. E. Bosson | J. E. Hardie | R. C. Peters |
| R. M. Burrows | J. G. Hawkins | T. M. Rankin |
| J. R. Cash | F. J. Hellings | H. F. Rickman |
| R. A. Crawford | K. W. Homb | H. Rogall |
| J. W. Davies | C. E. Hurlburt | L. M. Ross |
| H. B. Diamond | J. V. Johnston | R. C. Royce |
| J. DiGirolamo | J. H. Jordan | S. J. Sorger |
| K. E. Eggers | K. J. Klarman | C. B. Strang |
| E. G. Fotou | J. L. Luber | M. Taylor |
| H. A. Fredine | K. G. Mengersen | C. I. Thornburg |
| T. A. Fuhrman | F. B. Mikolait | R. L. Van Alstine |
| K. N. Green | G. E. Morrison | B. J. Wimber |

In addition, there were more than 130 others who attended meetings of the Gyro and Accelerometer Pan 1 and helped create this standard.

Contents

Part I — Standard Specification Format

| SECTION | PAGE |
|---|---|
| 1. Scope | 9 |
| 2. Applicable Documents | 9 |
|   2.1 Specifications | 9 |
|   2.2 Standards | 9 |
|   2.3 Drawings | 9 |
|   2.4 Bulletins | 9 |
|   2.5 Other Publications | 9 |
| 3. Requirements | 9 |
|   3.1 Description | 9 |
|   3.2 General Requirements | 9 |
|     3.2.1 Precedence | 9 |
|     3.2.2 Definitions | 9 |
|   3.3 Performance | 10 |
|     3.3.1 Operating Temperature | 10 |
|     3.3.2 Pickoff Characteristics | 10 |
|     3.3.3 Reference Constants | 10 |
|     3.3.4 Pendulum Elastic Restraint | 10 |
|     3.3.5 Input Limits | 10 |
|     3.3.6 Overload Capacity | 10 |
|     3.3.7 Capture Electronics | 10 |
|     3.3.8 Accelerometer Bias | 11 |
|     3.3.9 Accelerometer Scale Factor | 11 |
|     3.3.10 Nonlinearity | 12 |
|     3.3.11 Torquer Polarity | 12 |
|     3.3.12 Self-Test Torquer Characteristics | 12 |
|     3.3.13 Input-Axis Misalignment | 12 |
|     3.3.14 Cross Coupling | 12 |
|     3.3.15 Frequency Response | 12 |
|     3.3.16 Warmup Time | 12 |
|     3.3.17 Threshold | 12 |
|     3.3.18 Resolution | 13 |
|     3.3.19 Turn-On Hysteresis | 13 |
|     3.3.20 Life | 13 |
|   3.4 Mechanical Requirements | 13 |
|     3.4.1 Exterior Surfaces | 13 |
|     3.4.2 Dimensions | 13 |
|     3.4.3 Accelerometer Axes | 13 |
|     3.4.4 Weight | 13 |
|     3.4.5 Seal | 13 |
|     3.4.6 Identification of Product | 13 |
|   3.5 Electrical Requirements | 14 |
|     3.5.1 Electrical Schematic | 14 |
|     3.5.2 Excitation | 15 |
|     3.5.3 Impedances | 15 |
|     3.5.4 Insulation Resistance | 16 |

| SECTION | | | PAGE |
|---|---|---|---|
| | 3.5.5 | Dielectric Strength | 16 |
| | 3.5.6 | Electr magnetic Interference | 16 |
| | 3.5.7 | Magnetic Flux Leakage | 16 |
| 3.6 | Environmental Requirements | | 16 |
| | 3.6.1 | Nonoperative Environment | 16 |
| | 3.6.2 | Operative Environment | 17 |
| 3.7 | Reliability | | 18 |
| | 3.7.1 | Reliability Program | 18 |
| | 3.7.2 | Mean Time Between Failure | 18 |
| 4. Quality Assurance | | | 18 |
| 4.1 | Classification of Tests | | 18 |
| 4.2 | Acceptance Tests | | 18 |
| 4.3 | Qualification Tests | | 19 |
| 4.4 | Reliability Tests | | 20 |
| 4.5 | Test Conditions and Equipment | | 20 |
| 4.6 | Test Methods | | 20 |
| | 4.6.1 | Nonoperative Tests | 20 |
| | 4.6.2 | Operative Open-Loop Tests | 20 |
| | 4.6.3 | Operative Closed-Loop Tests | 20 |
| | 4.6.4 | Environmental Tests | 20 |
| 4.7 | Data Submittal | | 21 |
| 5. Preparation for Delivery | | | 21 |
| 6. Notes | | | 21 |
| 6.1 | Intended Use | | 21 |
| 6.2 | Ordering Data | | 21 |
| 6.3 | Model Equation | | 21 |

Part II — Standard Test Procedure

| | | | |
|---|---|---|---|
| 7. Scope | | | 22 |
| 8. Description | | | 22 |
| 9. Test Conditions and Equipment | | | 22 |
| 9.1 | Standard Test Conditions | | 22 |
| | 9.1.1 | Ambient Environment | 22 |
| | 9.1.2 | Installation Requirements | 22 |
| | 9.1.3 | Electrical Requirements | 22 |
| 9.2 | Test Equipment | | 23 |
| | 9.2.1 | General Requirements | 23 |
| | 9.2.2 | Description of Test Equipment | 23 |
| 9.3 | Starting Procedure | | 23 |
| | 9.3.1 | Operative Open-Loop Tests | 23 |
| | 9.3.2 | Operative Closed-Loop Tests | 23 |
| 10. Test Procedure | | | 23 |
| 10.1 Nonoperative Tests | | | 23 |
| | 10.1.1 | Examination of Product | 23 |
| | 10.1.2 | Weight | 23 |
| | 10.1.3 | Test Setup | 23 |
| | 10.1.4 | Impedance | 24 |

| SECTION | | PAGE |
|---|---|---|
| 10.1.5 | Dielectric Strength | 24 |
| 10.1.6 | Insulation Resistance | 24 |
| 10.1.7 | Seal | 25 |
| 10.1.8 | Temperature Sensor Characteristics | 25 |
| 10.1.9 | Power Stress | 26 |
| 10.2 Operative Open-Loop Tests | | 26 |
| 10.2.1 | Test Setup | 26 |
| 10.2.2 | Electrical Null | 27 |
| 10.2.3 | Pickoff Characteristics | 27 |
| 10.2.4 | Torquer and Self-Test Torquer Polarity | 27 |
| 10.2.5 | Frequency Response | 28 |
| 10.3 Operative Closed-Loop Tests | | 28 |
| 10.3.1 | Test Setup | 28 |
| 10.3.2 | Scale Factor and Bias | 29 |
| 10.3.3 | Pickoff Scale Factor and Pendulum Elastic Restraint | 30 |
| 10.3.4 | Input Axis Misalignment | 32 |
| 10.3.5 | Static Multipoint Test | 32 |
| 10.3.6 | Turn-On Hysteresis | 33 |
| 10.3.7 | Threshold and Resolution | 34 |
| 10.3.8 | Warmup Time | 34 |
| 10.3.9 | Self-Test Torquer Scale Factor | 35 |
| 10.3.10 | Short Term Stability | 35 |
| 10.3.11 | Long Term Stability | 36 |
| 10.3.12 | Reapeatability | 36 |
| 10.3.13 | Sensitivity | 36 |
| 10.3.14 | Centrifuge Input Range Test | 38 |
| 10.3.15 | Precision Centrifuge Test | 38 |
| 10.3.16 | Life, Storage | 39 |
| 10.3.17 | Life, Operating | 39 |
| 10.4 Environmental Tests | | 41 |

FIGURES

| Fig 1 | Dimensions | 14 |
|---|---|---|
| Fig 2 | Electrical Schematic | 15 |
| Fig 3 | Test Circuit for the Measurement of Pickoff Scale Factor and Pendulum Elastic Restraint | 31 |
| Fig 4 | Suggested Accelerometer Environment and Test Combinations | 40 |

APPENDIXES

Appendix A Accelerometer Dynamic Equations ... 42
A1 Introduction ... 42
A2 Open-Loop Operation ... 42
A3 Closed-Loop Operation ... 42
Appendix B Static Multipoint Test ... 43
B1 Introduction ... 43
B2 Model Equation ... 43
B3 Test Procedure — Mounting Position 1 ... 43
B4 Test Procedure — Mounting Position 2 ... 46
B5 Best Estimate of Model Equation Coefficients ... 47

FIGURES

Fig A1 Block Diagram for Open-Loop Operation ... 42
Fig A2 Block Diagram for Closed-Loop Operation ... 43

IEEE Standard Specification Format Guide and Test Procedure for Linear, Single-Axis, Pendulous, Analog Torque Balance Accelerometer

Part I — Standard Specification Format

1. Scope

This specification defines the requirements for a linear, single-axis, pendulous, analog torque balance accelerometer. The instrument is equipped with a permanent magnet torquer and is used as a sensing element to provide an electrical signal proportional to acceleration. The torque balance electronics are not considered to be part of the instrument.

2. Applicable Documents

The following documents of the issue in effect on date of invitation for bids or request for proposal form a part of the specification to the extent specified herein. In the event of any conflict between the requirements of this document and the listed documents, the requirements of this document shall govern.

> Give identification number, title, date of issue, and revision letter of each listed document.

2.1 Specifications
  2.1.1 *Government*
  2.1.2 *Industry/Technical*
  2.1.3 *Company*

2.2 Standards
  2.2.1 *Government*
  2.2.2 *Industry/Technical*
    2.2.2.1 Aerospace Industries Association, Standard Accelerometer Terminology, EETC Report 30, June 1965[1]
    2.2.2.2 IEEE Std 260-1967, Letter Symbols for Units Used in Electrical Science and Electrical Engineering
  2.2.3 *Company*

[1] Available from: National Standards Association, Inc
1321 Fourteenth Street, NW
Washington, DC 20005

2.3 Drawings
  2.3.1 *Government*
  2.3.2 *Industry/Technical*
  2.3.3 *Company*

2.4 Bulletins
  2.4.1 *Government*
  2.4.2 *Industry/Technical*
  2.4.3 *Company*

2.5 Other Publications

> Other applicable documents should be listed in appropriate categories.

3. Requirements 3.1 Description. The accelerometer is a linear, single-axis, non-gyroscopic, analog torque balance, pendulous device with permanent magnet torquer. It is normally used as a sensing element to provide an electrical signal proportional to acceleration. The analog electronics used in the torque balance capture loop are considered to be part of the test equipment.

3.2 General Requirements
  3.2.1 *Precedence.* In the event of conflict among the purchase agreement, this specification, and other documents referred to herein, the order of precedence shall be as follows:
  (1) Purchase agreement
  (2) This specification and its applicable drawings
  (3) Other applicable documents > List other applicable documents in order of precedence; see Section 2.

3.2.2 *Definitions.* The following document defines terminology used in this specification:

Aerospace Industries Associati n, *Standard Accelerometer Terminology*, EETC Report 30, June 1965.

3.3 Performance 3.3.1 *Operating Temperature.* The operating temperature, as indicated by the temperature sensor [on, within] the accelerometer, shall be _____ ± _____ °C.

> Section 3.3.1 is applicable only to an accelerometer with its own temperature control.

3.3.2 *Pickoff Characteristics*

3.3.2.1 *Scale Factor.* The pickoff scale factor shall be _____ = _____ V/rad.

> In some cases it may be desirable to specify the pickoff linearity.

3.3.2.2 *Phase.* When the angular displacement of the proof mass about the output axis is positive, the output voltage measured from terminal _____ (high) to terminal _____ (low) shall [lead, lag] the pickoff excitation by _____ ± _____ °. Similarly, when the angular displacement of the proof mass about the output axis is negative, the output voltage (high to low) shall [lag, lead] the pickoff excitation by _____ ± _____ °. The pickoff excitation shall be applied to terminals _____ (high) and _____ (low). These requirements shall be met for all output voltages greater than _____ V.

3.3.2.3 *Electrical Null.* The minimum electrical output shall not exceed _____ V rms.

> In some cases, it may be desirable to specify the fundamental, its harmonics, and quadrature.

3.3.2.4 *Maximum Output.* The maximum output voltage for proof-mass rotation in each direction shall be _____ ± _____ V rms.

> The output limits need not be symmetrical about the null.

3.3.3 *Reference Constants.* Nominal values of these constants are listed f r reference only. They are not specified as they may vary within the framework of the specification and because they are difficult or impossible to measure independently in a complete accelerometer.

(1) Moment of inertia of pendulum about the output axis _____ g · cm$^2$
(2) Pendulosity _____ g · cm
(3) Damping coefficient _____ dyn · cm · s
(4) Damping ratio _____
(5) Torquer scale factor _____ dyn · cm/mA
(6) Proof mass _____ g 3.3.4 *Pendulum Elastic Restraint.* The pendulum elastic restraint $K_r$ shall be _____ ± _____ g/rad for pendulum displacements within the range of 0 ± _____ ° (seconds — plane angle).

> Pendulum elastic restraint includes all restraints such as flex lead spring restraint, pivot spring restraint, and pickoff reaction torque restraint but it does not include the principal restraint (rebalance torque supplied by the servo loop). $K_r$ is related to $K_e$ of Appendix A by the following relationship: $K_r = K_e/(980 \times \text{pendulosity})$.

3.3.5 *Input Limits.* The input limits shall be = _____ g.

> The input limits need not be symmetrical about the null.

3.3.6 *Overload Capacity.* The accelerometer shall perform within specificati n requirements after an acceleration of _____ g has been applied along the _____ [axis, axes] for _____ seconds a total of _____ times.

3.3.7 *Capture Electronics.* The capture electronics, which is a part of the test equipment, shall have characteristics as follows.

3.3.7.1 *Input Characteristics*

(1) Source impedance _____ ± _____
[+, −]j _____ ± _____ Ω
(2) Input frequency _____ ± _____ Hz
(3) Input impedance _____ ± _____
[+, −]j _____ ± _____ Ω

(4) Input voltage, maximum _____ V [ac, dc]
(5) Input voltage, quadrature _____ V [rms, peak to peak]
(6) Input voltage, harmonics _____ V [rms, peak to peak]
(7) Input phase angle (relative to reference voltage) _____ ± _____ °

3.3.7.2 Output Characteristics (1) Load impedance _____ ± _____ [+, −]j _____ ± _____ Ω
(2) Output impedance _____ ± _____ [+, −]j _____ ± _____ Ω
(3) Polarity positive with [in-phase, out-of-phase] input
(4) Voltage range + _____ ± _____ V to − _____ ± _____ V
(5) Current range + _____ ± _____ mA to − _____ ± _____ mA
(6) With grounded input, the output shall be within ± _____ V dc and _____ V rms maximum
(7) Quadrature rejection shall be greater than _____ dB
(8) Noise shall be less than _____ mV rms 0 to _____ Hz for all input conditions of Section 3.3.7.1
(9) Gain $K_A$ _____ ± _____ V dc/V rms with the above specified output load impedance
(10) Frequency response > Describe the transfer function or the gain and phase characteristics, or both. Specify tolerances compatible with the application.
>
> It also may be desirable to specify short-circuit protection, overload protection, and removal of load protection in this section if required.

3.3.8 Accelerometer Bias

3.3.8.1 Absolute Value. The absolute value of the bias $K_0$ shall not exceed _____ g.

3.3.8.2 Short-Term Stability. The standard deviation of the bias from its mean value as determined over a period of _____ [hours, days] of continuous operation shall be less than _____ g. Bias measurements shall be made _____ times per day and at least _____ [minutes, hours] apart.

3.3.8.3 Long-Term Stability. The best fit slope of the bias determined over a period of _____ days of continuous operation shall be less than _____ g/day. The standard deviation of the bias data points from the best fit line shall be less than _____ g. Bias measurements shall be made _____ times per day and at least _____ [minutes, hours] apart.

> The unbiased estimate of the standard deviation may be substituted for the standard deviation. Alternate ways of specifying short-term or long-term stability or both may be used, for example, peak-to-peak deviation.

3.3.8.4 Repeatability. The rms deviation of the bias from the mean of _____ measurements shall be less than _____ g. Between successive measurements, the accelerometer shall be cooled to _____ °C for at least _____ hours.

> The cool-down time should be sufficient to attain thermal equilibrium. Other conditions for repeatability may be specified, such as turn-off with the accelerometer maintained at operating temperature.

3.3.8.5 Sensitivity. The absolute value of the sensitivity coefficients of the bias to variations from the standard test conditions of Section 4.5 shall not exceed the limits listed below:

(1) Pickoff excitation voltage _____ g/V
(2) Pickoff excitation frequency _____ g/Hz
(3) Operating temperature _____ g/°C
(4) External magnetic fields _____ g/T
(5) Pressure _____ g/(N/m²)
(6) Ambient temperature _____ g/°C

3.3.9 Accelerometer Scale Factor

3.3.9.1 Scale Factor and Tolerance. The scale factor $K_1$ shall be _____ ± _____ output units/g.

> The desired form of the output should be specified, for example, V or mA.

3.3.9.2 Short-Term Stability. The standard deviation of the scale factor from its mean value as determined over a period of _____ [hours, days] of continuous operation shall be less than _____ output units/g. Scale factor measurements shall be made _____ times per day and at least _____ [minutes, hours] apart.

3.3.9.3 *Long-Term Stability.* The best fit slope of the scale factor determined over a period of _____ days of continuous operation shall be less than _____ (output units/g) per day. The standard deviation of the scale factor data points from the best fit line shall be less than _____ output units/g. Scale factor measurements shall be made _____ times per day and at least _____ [minutes, hours] apart.

> The unbiased estimate of the standard deviation may be substituted for the standard deviation. Alternate ways of specifying short-term or long term stability, or both, may be used, for example, peak-to-peak deviation.

3.3.9.4 *Repeatability.* The rms deviation of the scale factor from the mean of _____ measurements shall be less than _____ output units/g. Between successive measurements, the accelerometer shall be cooled to _____ °C for at least _____ hours.

> The cool-down time should be sufficient to attain thermal equilibrium. Other conditions for repeatability may be specified, such as turn-off with the accelerometer maintained at operating temperature.

3.3.9.5 *Sensitivity.* The absolute value of the sensitivity coefficient of the scale factor to variations from the standard test conditions of Section 4.5 shall not exceed the limits listed below:
(1) Pickoff excitation voltage _____ percent/ V
(2) Pickoff excitation frequency _____ percent/Hz
(3) Operating temperature _____ percent/°C
(4) External magnetic fields _____ percent/T
(5) Pressure _____ percent/(N/m²)
(6) Ambient temperature _____ percent/°C 3.3.10 *Nonlinearity.* The absolute values of the second-order nlinearity coefficient $K_2$ and the third-order nonlinearity coefficient $K_3$ shall be less than _____ $g/g^2$ and _____ $g/g^3$, respectively.

3.3.11 *Torquer Polarity.* With a voltage applied between terminal _____ (high) and terminal _____ (low), the pickoff output v ltage shall be [in-phase, out-of-phase] with respect to the pickoff excitation voltage.

3.3.12 *Self-Test Torquer Characteristics*

3.3.12.1 *Self-Test Torquer Scale Factor.* The self-test torquer scale factor shall be _____ ± _____ mA/g.

3.3.12.2 *Self-Test Torquer Polarity.* With a voltage applied between terminal _____ (high) and terminal _____ (low), the pickoff output voltage shall be [in-phase, ut-of-phase] with respect to the pickoff excitation voltage.

3.3.13 *Input-Axis Misalignment.* The absolute value of the input-axis misalignment $δ_p$ about the pendulous axis shall be less than _____ [rad, g/cross g].

The absolute value of the input-axis misalignment $δ_o$ about the output axis shall be less than _____ [rad, g/cross g].

> In some applications it may be desirable to specify the input-axis misalignment stability or sensitivity, or both.

3.3.14 *Cross Coupling.* The absolute value of the cross-coupling coefficients $K_{ip}$, $K_{io}$ shall be less than _____ (g/g)/cross g.

3.3.15 *Frequency Response.* The open-loop frequency response shall conform to the following requirements:
(1) The input frequency corresponding to a phase lag of 45° shall be less than _____ Hz
(2) The input frequency corresponding to a phase lag of 135° shall be between _____ and _____ Hz > In some cases it may be desirable to specify the phase versus frequency characteristics.

3.3.16 *Warmup Time.* The output of the accelerometer shall be within _____ output units of its steady-state value in no more than _____ minutes after starting up from _____ °C.

3.3.17 *Threshold.* The threshold shall be less than _____ g.

3.3.18 *Resolution*. The resolution shall be less than _____ g.

3.3.19 *Turn-On Hysteresis*. The absolute value of the turn-on hysteresis shall be less than _____ g.

3.3.20 *Life*

3.3.20.1 *Operating Life.* Under the operating environment conditions specified in Section 3.6.2, the unit shall be capable of operating and performing within the requirements of this specification for a period of at least _____ hours.

3.3.20.2 *Storage Life.* Under the non-operating environment conditions specified in Section 3.6.1, the life of the instrument shall be greater than _____ years.

3.4 Mechanical Requirements 3.4.1 *Exterior Surfaces.* All exterior surfaces must withstand the environment herein specified and the handling expected in the normal course of operation, testing, and maintenance without deterioration which causes nonconformance to this specification.

> Additional requirements controlling surface finish, protective treatment, metals, dissimilar metals, workmanship, etc. may be designated by the procuring organization.

3.4.2 *Dimensions.* The outline, mounting dimensions and location of the center of gravity shall conform to Fig 1.

3.4.3 *Accelerometer Axes.* The input, pendulous, and output reference axes and their positive directions shall be defined by external markings and by reference mounting [surface, surfaces] as indicated in Fig 1. The location of the center of gravity of the accelerometer ($CG_A$) and the location of the center of gravity of the proof mass ($CG_M$) are also given. The positive directions of the axes shall be such that the cross product of input axis and pendulous axis shall be along the output axis.

3.4.4 *Weight.* The weight shall be _____ ± _____ [g, kg, oz, lb].

> If appropriate, maximum weight only need be specified. When accessories such as cable or connector are to be included in the weight, the specification shall so state.

3.4.5 *Seal*

> In general, nly one f the two methods given below w uld be specified.

(1) *Fluid Filled.* The accelerometer shall be sealed such that no fluid leakage is detected under _____ power magnification after being subjected to an external vacuum at _____ ± _____ torr, and an accelerometer temperature of _____ ± _____ °C for a minimum period of _____ minutes.

> In some cases, other procedures may be more appropriate, such as the use of fluorescent tracers in the fluid to facilitate leak detection, or weight loss may be measured to indicate leakage.

(2) *Gas Filled.* The accelerometer shall be sealed such that the maximum gas leakage shall not exceed _____ $cm^3$ of helium per second or equivalent, measured at standard conditions, during a minimum period of _____ minutes that the accelerometer is being subjected to a vacuum of _____ ± _____ torr at a temperature of _____ ± _____ °C.

Or

The accelerometer shall be sealed such that there shall be no flow of bubbles during a period of _____ minutes when the accelerometer is placed in a bath of _____ having a viscosity of _____ centistokes at _____ °C.

> Tracer gases may be added to the fill gas in order to facilitate leak detection.
> In the bubble test, care must be taken to distinguish bubbles due to leakage from those due to absorbed gases on the outer surface.

3.4.6 *Identification of Product.* The accelerometer shall be marked on the surface with the following information:
(1) Name of component
(2) Model number
(3) Stock number
(4) Part number
(5) Contract number
(6) Unit serial number
(7) Manufacturer's name or symbol > The purchase agreement may require ther or additi nal identification.

WO 00/55652 PCT/US00/06032

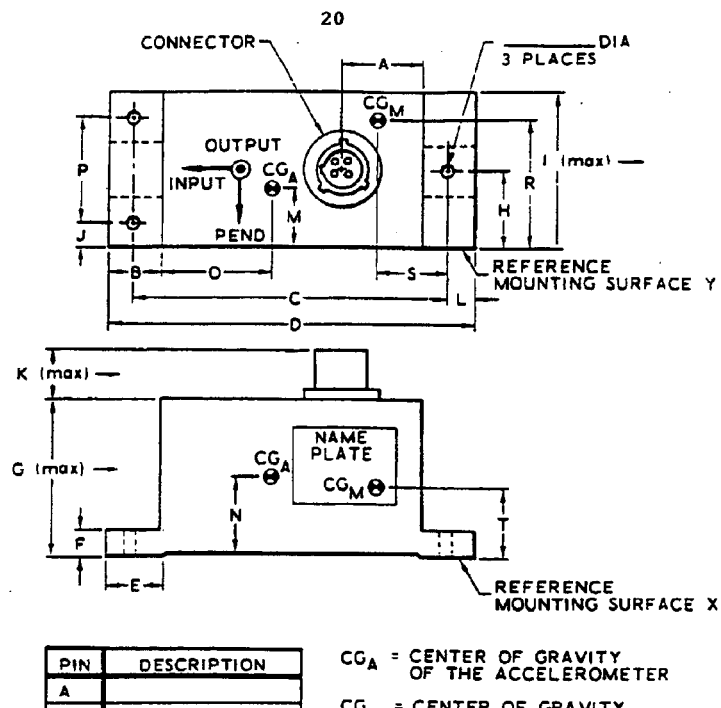

Fig 1
Dimensions

Give nominal dimensions and tolerances. It is not intended that this sample drawing offer specific information, but it is to be used as a guide. The accelerometer may be cylindrical, square, etc.

3.5 Electrical Requirements 3.5.1 *Electrical Schematic.* The accelerometer electrical circuits shall be as shown in Fig 2.

3.5.2 *Excitation*

3.5.2.1 *Pickoff.* The pickoff excitation shall be (1) Frequency _____ ± _____ Hz (2) [Voltage, Current] _____ ± _____ [V, mA]

(3) Maximum [voltage, current] waveform distortion _____ percent

WO 00/55652  PCT/US00/06032

Fig 2
Electrical Schematic (Basic Circuits: Pickoff Variable Reluctance (Primary/Secondary), Torquer, Case Ground; Terminal designations 1–7; HI/LO Excitation, HI/LO Signal; Connector.

Auxiliary and Alternate Circuits: Pickoff Variable Capacitance, Self-Test Torquer, Heaters Control, Heaters Warmup, Temperature Sensor; Terminals 1–4, 8–15; HI/LO Excitation, HI/LO Signal.)

(4) Source impedance _____ ± _____ Ω

Specify wave shape if other than sinusoidal.

3.5.2.2 *Heaters.* The heater excitations shall be as follows:
(1) *Warmup Heater*
Frequency _____ ± _____ Hz
Voltage _____ ± _____ V
Current _____ A maximum
Type of control is
(2) *Control Heater*
Frequency _____ ± _____ Hz
Voltage _____ ± _____ V
Current _____ A maximum
Type of control is _____

3.5.2.3 *Temperature Sensor.* The temperature sensor excitation shall be
(1) Frequency _____ ± _____ Hz
(2) Voltage _____ ± _____ V 3.5.2.4 *Self-Test Torquer.* The self-test torquer excitation shall be:
(1) Maximum input [voltage, current] _____ [V, mA]
(2) Electrical noise shall not exceed _____ mV
(3) Source impedance _____ ± _____ Ω

3.5.3 *Impedances.* The impedances shall conform to the following specifications when the unit is at the operating temperature.
3.5.3.1 *Pickoff*
(1) The pickoff input impedance shall be _____ ± _____ [+, −]j _____ ± _____ Ω at the specified excitation and output load (2) The output load impedance shall be
_____ ± _____ Ω
(3) The output impedance shall be
± _____ [+, −] j _____ ± _____ Ω with the specified pickoff excitation 3.5.3.2 *Heaters.* The warmup heater resistance shall be _____ ± _____ Ω and the inductance shall be less than _____ H.

The control heater resistance shall be _____ ± _____ Ω and the inductance shall be less than _____ H.

3.5.3.3 *Temperature Sensor.* The temperature sensor resistance shall be _____ ± _____ Ω and the temperature coefficient shall be [+, −] _____ ± _____ Ω/°C at _____ °C.

3.5.3.4 *Torquer.* The torquer impedance shall be _____ ± _____ [+, −] j _____ ± _____ Ω when measured at a frequency of _____ Hz.

> In some cases, it may be desirable to specify the dc resistance or the impedance at several frequencies.

3.5.3.5 *Self-Test Torquer.* The self-test torquer resistance shall be _____ ± _____ Ω.

3.5.4 *Insulation Resistance.* The insulation resistance between isolated circuits and between the accelerometer case and circuits isolated from the case shall not be less than _____ MΩ measured at _____ ± _____ V dc applied for _____ = _____ seconds.

> Lower voltages may be specified for certain elements, such as the pickoff input to output. The time specified should allow for time constants of RFI filters, if any.

3.5.5 *Dielectric Strength.* The leakage current shall not exceed _____ mA when _____ ± _____ V rms, _____ Hz are applied between isolated circuits and between the accelerometer case and circuits isolated from the case for _____ ± _____ seconds.

> Lower voltages may be specified for certain elements, such as the pickoff input to output. For some cases lower voltages may be specified for subsequent tests.

3.5.6 *Electromagnetic Interference.* The electromagnetic interference shall b in accordance with _____.

> In the United States, a common standard is MIL-STD-461.

3.5.7 *Magnetic Flux Leakage.* The magnetic flux leakage shall not exceed _____ T at a distance of _____ cm from the accelerometer in any direction.

3.6 Environmental Requirements. The nvironmental conditions listed in this section are those to which the instrument may be subjected during storage, transportation, and handling or operation, or both. The quipment shall be designed to survive these environments and to successfully complete the environmental tests specified in Section 4.

3.6.1 *Nonoperative Environment.* The following conditions, occurring separately or in combination, may be encountered during transportation and handling, or storage, or both. The accelerometer shall conform to all the requirements of Section 3.3 after exp sure to any reasonable combinations of the specified service conditions.

> Where appropriate, the environment specified must be adjusted for the protection afforded by packaging.

3.6.1.1 *Temperature and Thermal Radiation.* Ambient temperature may vary from a minimum of _____ °C to a maximum of _____ °C under unsheltered ground conditions. Areas exposed to direct sunlight shall be considered as unsheltered conditions.

3.6.1.2 *Vibration*

> Describe the vibration environm nt. For sinusoidal vibration, include the sp - cific vibration amplitude versus frequency, duration, or sweep rate and axes of application. For random vibration, specify power spectral density (provide figure if complex), tolerance, bandwidth, peak acceleration level, total rms accelerati n, duration, and axes of application.

3.6.1.3 *Mechanical Shock*

> Specify the shock wave shape, duration of the pulse, tolerances, number of shocks, and axes of application.

3.6.1.4 *Thermal Shock.* _____ °C to _____ °C. The heating and cooling rates f the ambient environment shall be approximately _____ °C/s.

> For cyclic conditions, specify temperature limits for each level, dwell times, and sequence.

3.6.1.5 *Pressure.* _____ [N/m², lbf/in²] to _____ [N/m², lbf/in²]. The rate of change of pressure shall be nominally _____ [(N/m²)/s, (lbf/in²)/s].

> If appropriate, pressure may be expressed in terms of altitude and rate of climb.

3.6.1.6 *Fungus*

> Specify fungus organisms, length of exposure, and temperature and humidity conditions during exposure.

3.6.1.7 *Humidity.* Relative humidity from 0 to 100 percent with conditions such that condensation may take place in the form of water or frost.

3.6.1.8 *Salt Spray.* _____ percent salt solution for _____ hours.

3.6.1.9 *Magnetic Fields*

> Define magnitudes, directions of fields with respect to each axis, and duration. If exposure to fields resulting from alternating current is desired, specify intensity versus frequency.

3.6.1.10 *Sand and Dust.* _____ [g/m³, g/ft³] at a velocity of _____ ± _____ [m/s, ft/min] for _____ hours. Relative humidity not to exceed _____ percent.

3.6.1.11 *Other*

> Include any other appropriate nonoperative environmental conditions such as acoustic noise, rain, air currents, etc.

3.6.2 *Operative Environment.* The following conditions, occurring separately or in combination, may be encountered during operation. The accelerometer shall conform to all the requirements of Section 3.3 during, unless otherwise specified, and after exposure to any reasonable combination of the specified service conditions.

3.6.2.1 *Thermal*

> It may be impractical or impossible to make meaningful measurements during exposure to some environmental conditions; under other environmental conditions a degraded performance may be allowed. The procuring organization should specify such deviations in the section which specifies the environment.

3.6.2.1.1 *Temperature (High and Low).* Ambient temperature may vary from _____ °C to _____ °C under sheltered conditions (protected from direct sunlight).

3.6.2.1.2 *Thermal Shock.* _____ °C t _____ °C. The heating and cooling rates of the ambient environment shall be approximately _____ °C/s.

> For cyclic conditions, specify temperature limits for each level, dwell times, and sequence.

3.6.2.1.3 *Other*

> Other thermal conditions which may affect performance shall be specified, for example, equivalent heat sink, radiant energy from surrounding surfaces, power dissipation, and type of atmosphere.

3.6.2.2 *Vibration*

> Describe the vibration environment. For sinusoidal vibration, include the specific vibration amplitude versus frequency, duration or sweep rate, and axes of application. For random vibration, specify power spectral density (provide figure if complex), tolerance, bandwidth, peak acceleration level, total rms acceleration, duration, and axes of application.

3.6.2.3 Mechanical Shock

> Specify the shock wav shape, duration of the pulse, tolerances, number f shocks, and axes of application.

3.6.2.4 *Pressure.* _____ [N/m², lbf/in²] to _____ [N/m², lbf/n²]. The rate of change of pressure shall be nominally _____ [(N/m²)/s, (lbf/in²)/s].

> If appropriate, pressure may be expressed in terms of altitude and rate of climb.

3.6.2.5 *Humidity.* The operative relative humidity shall be _____ percent maximum.

3.6.2.6 Acoustic Noise

> Describe the acoustic noise environment. Supply the specific noise spectrum in dB versus frequency, tolerance, bandwidth, peak level, and duration. Use a 0-dB reference of 0.0002 dyn/cm².

3.6.2.7 Electromagnetic Interference

> Specify the requirements. In the United States, compliance with MIL STD-826 and MIL-E-6051 of latest issue is usually considered adequate.

3.6.2.8 Magnetic Fields

> Define magnitudes, directions of fields with respect to each axis, and duration. If exposure to fields resulting from alternating current is desired, specify intensity versus frequency.

3.6.2.9 Acceleration

> Specify the maximum acceleration along each of the three axes and the duration.

3.6.2.10 Other

> Include any other appropriate operative environmental conditions such as fungus, salt spray, nuclear radiation, etc.

3.7 Reliability 3.7.1 *Reliability Program.* The reliability program shall be in accordance with _____

> In the United States, a commonly used standard is MIL-STD-785.

3.7.2 *Mean Time Between Failure.* The MTBF shall be a minimum of _____ hours with a lower confidence limit of _____ percent.

4. Quality Assurance

All tests governed by this specification shall be conducted in accordance with detailed test procedures prepared by the contractor and approved by the procuring organization.

4.1 Classification of Tests. The inspection and testing of the accelerometer shall be classified as follows.

(1) *Acceptance Tests.* Acceptance tests are those performed on accelerometers submitted for acceptance under contract (2) *Qualification Tests.* Qualification tests are those performed on samples submitted for qualification as a satisfactory product (3) *Reliability Tests.* Reliability tests are those performed to demonstrate the level of reliability and to assure the ability to maintain, with a certain confidence, the assessed reliability 4.2 Acceptance Tests. Acceptance tests shall consist of individual and sample tests.

4.2.1 *Individual Tests.* Each accelerometer shall be subjected to the following tests d - scribed under Section 4.6, Test Methods.

> The list of individual tests shall be specified by the procuring organization based on the requirements. The number or type of individual tests specified is at the discretion of the procuring organization. Those tests frequently specified as individual tests are listed below.

(1) Section 4.6.1.1, Examination of Product
(2) Section 4.6.1.3, Impedance
(3) Section 4.6.1.4, Dielectric Strength
(4) Section 4.6.1.5, Insulation Resistance
(5) Section 4.6.1.6, Seal
(6) Section 4.6.2.1, Electrical Null
(7) Section 4.6.2.2, Pickoff Characteristics
(8) Section 4.6.2.3, Torquer and Self-Test Torquer Polarity Tests
(9) Section 4.6.2.4, Frequency Response
(10) Section 4.6.3.1, Scale Factor and Bias
(11) Section 4.6.3.3, Input-Axis Misalignment
(12) Section 4.6.3.5, Turn-On Hysteresis
(13) Section 4.6.3.8, Self-Test Torquer Scale Factor
(14) Section 4.6.3.9, Short-Term Stability
(15) Section 4.6.3.11, Repeatability
(16) Section 4.6.3.13, Centrifuge Input Range Test > There are other individual tests which are not generally specified but which may be included, and there are some listed above which may be deleted depending on the requirements of the specific application.

4.2.2 Sampling Plan and Tests

4.2.2.1 Sampling Plan. Accelerometers selected per [describe sampling method] shall be subjected to the tests specified in Section 4.2.2.2.

> This paragraph is intended to designate a sampling plan whereby samples are periodically selected for more complete tests, if required. Sampling plans are at the discretion of the procuring organization based upon usage, size of contract, individual requirements, etc.
> In the United States, selection according to MIL-STD-105 is common.

4.2.2.2 Sample Tests. Accelerometers selected in accordance with Section 4.2.2.1 shall be subjected to the following tests described under Section 4.6, Test Methods.

> The procuring organization shall specify those tests which shall be performed on accelerometers selected in accordance with the sampling plan, Section 4.2.2.1. Th se tests frequently specified for sample tests are listed below. Sampling-plan units may be used for delivery unless the procuring organization specifies life tests or other destructive tests under the sampling plan.

(1) Individual tests listed in Section 4.2.1
(2) Section 4.6.1.2, Weight
(3) Section 4.6.1.7, Temperature Sensor Characteristics
(4) Section 4.6.1.8, Power Stress
(5) Section 4.6.3.2, Pickoff Scale Factor and Pendulum Elastic Restraint
(6) Section 4.6.3.4, Static Multipoint
(7) Section 4.6.3.6, Threshold and Resolution
(8) Section 4.6.3.7, Warmup Time
(9) Section 4.6.3.14, Precision Centrifuge Test
(10) Section 4.6.4.3, Acceleration
(11) Section 4.6.4.4, Temperature (High, Low)

4.2.3 Rejection and Retest. When a unit from the production run fails to meet the specification requirements, the procuring rganization shall be notified of the failure. The cause of the failure shall be determined, and rejection and retest shall be accomplished in accordance with the following plan. [Describe rejection and retest plan.] After correcti ns have been made, the complete test under which failure occurred and also any tests which might be affected by the corrective measures taken, shall be defined and approved by the procuring organization. The unit shall complete the retest without further failure before it will be considered to hav passed the test. For operational and production reasons, individual tests may be continued pending the investigation of the failure.

4.2.4 Defects in Accepted Items. The investigation of a test failure could indicate that defects may exist in items already accepted. If so, the manufacturer shall fully advise th procuring organization of defects likely to be found and of methods for correcting them.

4.3 Qualification Tests

4.3.1 Qualification Test Samples. A pre-production sample of _____ accelerometers manufactured in accordance with the requirements of this specification shall be subjected to qualification tests specified herein. The procuring organization may designate an independent facility at which one or more of these tests may be performed.

If the product is later modified in any way, the modified form shall be subjected to and pass those qualification tests designated by the procuring organization.

The qualification test samples shall be identified with the manufacturer's own part number and any other information required by the procuring organization.

4.3.2 Qualification Tests

> The procuring organization shall specify from Section 4.6, Test Methods, those tests which shall be performed on the qualification test samples. It is usual to require all the individual tests as listed in Section 4.2.1, selected sample tests from Section 4.2.2.2, sensitivity test from Section 4.6.3.12, long-term stability from Section 4.6.3.10, and all of the environmental tests in Section 4.6.4.

4.4 Reliability Tests. The MTBF requirements of Section 3.7.2 shall be demonstrated by testing _____ production units for _____ hours minimum each and a minimum time of _____ hours combined.

> Other methods of demonstration testing may be selected at the discretion of the procuring organization. A demonstration test plan shall be prepared to define test conditions, types of tests, failures, etc. In some cases it may be desirable to combine the reliability tests with the life tests of Sections 4.6.4.17 and 4.6.4.18.

4.5 Test Conditions and Equipment

> The procuring organization shall specify from Section 9 of this standard the nominal test conditions and the test equipment required. The test equipment shall be listed by name and model, part number, or performance requirements. The conditions shall apply to all tests unless otherwise specified. When a test condition is specified, the complete test conditions shall be detailed in this specification.

4.6 Test Methods

> Instructions for performing specified tests in this section are detailed in Section 10 of this standard. When a test is specified, the complete test method shall be detailed in this specification, including requirements to be met after test to determine satisfactory performance. A test method should not be listed in Section 4.6 unless a requirement exists in Section 3 of this specification.

4.6.1 *Nonoperative Tests*
    4.6.1.1 *Examination of Product*
    4.6.1.2 *Weight*
    4.6.1.3 *Impedance*
    4.6.1.4 *Dielectric Strength*
    4.6.1.5 *Insulation Resistance*
    4.6.1.6 *Seal*
    4.6.1.7 *Temperature Sensor Characteristics*
    4.6.1.8 *Power Stress*
4.6.2 *Operative Open-Loop Tests*
    4.6.2.1 *Electrical Null*
    4.6.2.2 *Pickoff Characteristics*
    4.6.2.3 *Torquer and Self-Test Torquer Polarity*
    4.6.2.4 *Frequency Response*
4.6.3 *Operative Closed-Loop Tests*
    4.6.3.1 *Scale Factor and Bias*
    4.6.3.2 *Pickoff Scale Factor and Pendulum Elastic Restraint*
    4.6.3.3 *Input-Axis Misalignment*
    4.6.3.4 *Static Multipoint*
    4.6.3.5 *Turn-On Hysteresis*
    4.6.3.6 *Threshold and Resolution*
    4.6.3.7 *Warmup Time*
    4.6.3.8 *Self-Test Torquer Scale Factor*
    4.6.3.9 *Short-Term Stability*
    4.6.3.10 *Long-Term Stability*
    4.6.3.11 *Repeatability*
    4.6.3.12 *Sensitivity*
    4.6.3.13 *Centrifuge Input Range*
    4.6.3.14 *Precision Centrifuge*
4.6.4 *Environmental Tests*
    4.6.4.1 *Vibration*
    4.6.4.2 *Mechanical Shock*
    4.6.4.3 *Acceleration*
    4.6.4.4 *Temperature (High, Low)*
    4.6.4.5 *Thermal Shock*
    4.6.4.6 *Thermal Radiation*
    4.6.4.7 *Pressure (High, Low)*

4.6.4.8 *Acoustic Noise*
4.6.4.9 *Electromagnetic Interference*
4.6.4.10 *Magnetic Fields*
4.6.4.11 *Magnetic Flux Leakage*
4.6.4.12 *Fungus*
4.6.4.13 *Humidity*
4.6.4.14 *Salt Spray*
4.6.4.15 *Sand and Dust*
4.6.4.16 *Nuclear Radiation*
4.6.4.17 *Life, Storage*
4.6.4.18 *Life, Operating*

4.7 Data Submittal

> The format for all data organization and the method of submittal shall be specified.

5. Preparation for Delivery

> Give detailed procedures for (1) preservation and packaging, (2) packing, and (3) marking of shipping containers. A common United States specification covering preservation and packaging is MIL-P-116. Other organizations use different supporting documents.

6. Notes 6.1 Intended Use

> Describe application if it is considered necessary or helpful.

6.2 Ordering Data

> Procuring documents should specify the title, number, and date of this specification. In addition, the following, or other items, should be specified as applicable:
> (1) Level of packaging and packing desired
> (2) Mode of shipment required
> (3) Sampling-plan tests if any
> (4) Number of preproduction samples to be submitted for qualification testing
> (5) Data package 6.3 Model Equation The model equation of the accelerometer is defined as a series which mathematically relates the accelerometer output to the components of acceleration applied parallel and normal to the accelerometer's input reference axis.

$$A_{ind} = \frac{E}{K_1} = K_0 + a_i + K_2 a_i^2 + K_3 a_i^3 + \delta_o a_p + K_{ip} a_i a_p - \delta_p a_o + K_{io} a_i a_o$$

where
$A_{ind}$ = acceleration indicated by the accelerometer in $g$
$E$ = accelerometer output in accelerometer output units
$a_i$ = Applied acceleration component along the positive input reference axis in $g$ (see Note below)
$a_p$ = applied acceleration component along the positive pendulous reference axis, in $g$ (see Note below)
$a_o$ = applied acceleration component along the positive output reference axis, in $g$ (see Note below)
$K_0$ = bias, in $g$
$K_1$ = scale factor, in output units per $g$
$K_2$ = second-order nonlinearity coefficient, in $g/g^2$
$K_3$ = third-order nonlinearity coefficient, in $g/g^3$
$\delta_o$, $\delta_p$ = misalignment of the input axis with respect to the input reference axis ab ut the output and pendulous axes, respectively, in radians
$K_{ip}$, $K_{io}$ = cross-coupling coefficients, in $(g/g)/cross\ g$, that is, $g/g^2$ NOTE: Applied acceleration refers only to non-gravitational acceleration since an accelerometer cannot sense the acceleration of free fall. The attractive force of gravity acting on the proof mass of an earthbound accelerometer is equivalent in effect to the inertia or reaction force due to an upward acceleration of 1 $g$.

> The coefficients of the model equation may be functions of other variables such as voltage, temperature, time, angular velocity, etc.
> Some of the above terms may be deleted or others added as appropriate for the type of accelerometer and its applications. Only a sufficient number of terms should be used that will adequately describe the response of the accelerometer.
> In those cases where the forcing function is the local gravity vector, it should be noted that the magnitude of gravity varies with location, including effect of altitude, and it is necessary to normalize the measured coefficients to a standard value of gravity when comparing data obtained at different test locations.

Part II — Standard Test Procedure

7. Sc pe

This test procedure describes the test requirements for _____ [model number, part number, change letter (if any), other identification], manufactured by _____ [name, address].

8. Description

The accelerometer considered in this document is a linear, single-axis, non-gyroscopic, analog torque balance, pendulous device with permanent magnet torquer. It is normally used as a sensing element to provide an electrical signal proportional to acceleration. The analog electronics used in the torque balance capture loop are considered to be part of the test equipment.

9. Test Conditions and Equipment

9.1 Standard Test Conditions 9.1.1 *Ambient Environment*. The conditions listed below define the requirements for the environment in the immediate vicinity of the instrument. They are not intended as environmental tests, which are described in Section 10.4.

9.1.1.1 *Atmospheric Conditions*
(1) Pressure _____ ± _____ [N/m², lbf/in²]
(2) Ambient temperature _____ ± _____ °C
(3) Relative humidity _____ to _____ percent 9.1.1.2 *Magnetic Field*
(1) Horizontal component _____ T, maximum
(2) Vertical component _____ T, maximum > In some applications, careful consideration should be given to the magnitude of ac magnetic fields.

9.1.1.3 *Radiation*. All tests are to be performed under radiation conditions as listed below.

> List types of radiati n and applicable intensity limits.

9.1.1.4 *Vibration*. Total accelerati n _____ g rms over the frequency range of _____ to _____ Hz.

> Above limits normally apply to each f the three axes of the accelerometer coordinate system.

9.1.2 *Installation Requirements*

> The mounting [fixture, fixtures] should be designed to reasonably simulate the application conditions and should be carefully specified.

9.1.2.1 *Operating Temperature*. The p-erating temperature, as indicated by the temperature sensor [on, within] the accelerometer, shall be _____ ± _____ °C.

> In some applications, careful consideration should be given to the magnitude of thermal gradients existing across the accelerometer.

9.1.2.2 *Mechanical Conditions*. The test unit should be mounted in such a way that the alignment of its three reference axes with respect to the axes of the test fixture is maintained within _____ ′ under all specified test conditions. The three reference axes f the test unit are those defined by external case markings and mounting [surface, surfaces] as indicated in Fig 1.

.9.1.3 *Electrical Requirements*

9.1.3.1 *Electrical Circuits*. The accelerometer electrical circuits shall be as shown in Fig 2.

9.1.3.2 *Pickoff Excitation*. Frequency _____ ± _____ Hz. [Voltage, Current] _____ ± _____ [V, mA]. Maximum [voltage, current] waveform distortion _____ percent. Source impedance _____ ± _____ Ω.

> Specify wave shape if other than sinusoidal.

9.1.3.3 *Self-Test Torquer.* Maximum input [voltage, current] _____ ± _____ [V, mA]. Electrical noise shall not exceed _____ mV. Source impedance _____ ± _____ Ω.

9.1.3.4 *Warmup Heater.* Frequency _____ ± _____ Hz. Voltage _____ ± _____ V. Current _____ A maximum. Type of control is _____.

9.1.3.5 *Control Heater.* Frequency _____ = _____ Hz. Voltage _____ ± _____ V. Current _____ A maximum. Type of control is _____.

> With a proportional temperature control, consideration should be given to its gain (W/°C). The hysteresis associated with thermostatic-type controls should be specified.

9.1.3.6 *Temperature Sensor.* Frequency _____ ± _____ Hz. Voltage _____ = _____ V.

9.1.3.7 *Interconnections*

(1) *Operative Open-Loop Tests.* Interconnections, test points, and grounding shall be as specified on schematic diagram _____.

(2) *Operative Closed-Loop Tests.* Interconnections, test points, and grounding shall be as specified on schematic diagram _____.

> Voltage gradients between the accelerometer case and internal circuitry may produce extraneous torques on the proof mass and should be given careful consideration.

9.2 Test Equipment
9.2.1 *General Requirements*

> The selection of test equipment should be based on accuracy requirements compatible with the performance specifications. Similarly, the bandpass of the measuring devices should be chosen so as to provide information within the frequency spectrum of interest for the tests.

9.2.2 *Description of Test Equipment*

> All special-purpose and commercial test equipment shall be listed by name, model, part number, or performance requirement.

9.3 Starting Procedure
9.3.1 *Operative Open-Loop Tests*
9.3.2 *Operative Closed-Loop Tests*

> State sequence of operations in Sections 9.3.1 and 9.3.2 required to bring accelerometer and test equipment to operating conditions.

10. Test Procedure 10.1 Nonoperative Tests. These procedures are intended to assure the conformance f the accelerometer to the mechanical and el c- trical requirements.

10.1.1 *Examination of Product.* The accelerometer shall be examined visually for proper identification, surface finish, defects in workmanship, and dimensional conformanc to the outline drawing _____.

10.1.2 *Weight.* Measure the weight of th accelerometer. The weight shall be _____ ± _____ [g, kg, oz, lb].

> When accessories such as cable or connector are to be included in the weight, they should be specified.

10.1.3 *Test Setup*

(1) Unless otherwise specified, all n n- operative tests shall be performed in a normal laboratory environment as described in Section 9.1.1

(2) The accelerometer shall be mounted on a simple mounting fixture that will minimize the chances for accidental mechanical damage (3) The electrical leads, if required, shall be brought out to a junction box or equivalent device that will minimize the chance of accidental electrical damage due to sh rting across leads, etc. Terminal designations are shown in Fig 2

> Care must be taken in the choice of the junction box and the size and length of leads in order to avoid affecting the characteristics of the accelerometer circuits.

10.1.4 Impedance

10.1.4.1 Purpose. The purpose of this test is to measure the impedance of the accelerometer's electrical circuits.

10.1.4.2 Test Equipment. The following test equipment specified in Section 9.2 is required for this test:

Impedance measuring equipment
Resistance measuring equipment

10.1.4.3 Test Setup. The test setup shall be in accordance with Section 10.1.3.

10.1.4.4 Test Procedure. Measure the impedances of each circuit listed below.

(1) *Pickoff*
Input impedance of the pickoff between terminals _____ and _____ at _____ ± _____ Hz
Output impedance of the pickoff between terminals _____ and _____ at _____ ± _____ Hz (2) *Heaters*
Impedance of the warmup heater between terminals _____ and _____ at _____ ± _____ Hz
Impedance of the control heater between terminals _____ and _____ at _____ ± _____ Hz (3) *Temperature Sensor.* Resistance of the temperature sensor between terminals _____ and _____

(4) *Torquer.* Impedance of the torquer between terminals _____ and _____ at _____ ± _____ Hz (5) *Self-Test Torquer.* Resistance of the self-test torquer between terminals _____ and _____

10.1.4.5 Test Results

(1) The input impedance of the pickoff shall be _____ ± _____ [ +, - ] j _____ = _____ Ω

(2) The output impedance of the pickoff shall be _____ ± _____ [ +, - ] j _____ ± _____ Ω

(3) The resistance of the warmup heater shall be _____ ± _____ Ω and the inductance shall be less than _____ H (4) The resistance of the control heater shall be _____ ± _____ Ω and the inductance shall be less than _____ H (5) The resistance of th temperature sens r shall be _____ ± _____ Ω at _____ °C (6) The impedance of the t rquer shall be _____ ± _____ [ +, - ] j _____ = _____ Ω

(7) The resistance of the self-test torquer shall be _____ ± _____ Ω

> In some cases it may be desirable t conduct the impedance test at operating temperature.

10.1.5 Dielectric Strength

10.1.5.1 Purpose. The purpose of this test is to ascertain that the accelerometer circuits can operate safely at their rated voltage and withstand overvoltage due to switching, surges, etc. by monitoring the leakage current between isolated circuits and between the accelerometer case and circuits isolated from the accelerometer case.

10.1.5.2 Test Equipment. The following test equipment specified in Section 9.2 is required for this test:

Adjustable ac high-voltage source equipped with voltage- and current-measuring capabilities.

10.1.5.3 Test Setup. The test setup shall be in accordance with Section 10.1.3.

10.1.5.4 Test Procedure. Apply _____ = _____ V rms at _____ Hz between mutually isolated circuits and between each cir-. cuit and the accelerometer case. The test voltage shall be raised from zero to the specified value as uniformly as possible, at a rate f _____ V rms per second. The test voltage shall then be gradually reduced to zero. During each test the current meter shall be monitored for leakage current and the result recorded.

10.1.5.5 Test Results. The leakage current shall not exceed _____ mA.

10.1.6 Insulation Resistance

10.1.6.1 Purpose. The purpose of this test is to measure the insulation resistance between isolated circuits and between the accelerometer case and circuits isolated from the case.

10.1.6.2 Test Equipment. The following test equipment specified in Section 9.2 is required for this test:

Megohmmeter

10.1.6.3 Test Setup. Th test setup shall be in acc rdance with Section 10.1.3.

10.1.6.4 *Test Procedure.* Apply _____ ± _____ V dc for a period of _____ ± _____ seconds between mutually isolated circuits and between each circuit and the accelerometer case. Record the minimum resistance readings.

10.1.6.5 *Test Results.* The minimum insulation resistance shall not be less than _____ MΩ.

10.1.7 *Seal*

> This procedure is written to accommodate either fluid- or gas-filled instruments. The appropriate subsections, below, should be chosen.

10.1.7.1 *Purpose.* The purpose of this test is to determine that the accelerometer is properly sealed.

10.1.7.2 *Test Equipment.* The following test equipment specified in Section 9.2 is required for this test:
(1) *Fluid-Filled Accelerometer*
   Binocular microscope
   Vacuum enclosure
(2) *Gas-Filled Accelerometer*
   Leak detector or immersion fluid (specify)
   Vacuum enclosure 10.1.7.3 *Test Setup.* The test setup shall be in accordance with Section 10.1.3.(2).

10.1.7.4 *Test Procedure*
(1) *Fluid-Filled Accelerometer.* After thorough cleaning of all surfaces, the accelerometer shall be placed in a vacuum enclosure at _____ ± _____ torr and at an accelerometer temperature of _____ ± _____ °C for a minimum period of _____ minutes. The accelerometer shall then be removed and visually examined for evidence of leakage at a magnification of _____.

(2) *Gas-Filled Accelerometer.* The accelerometer shall be placed in a vacuum enclosure at _____ ± _____ torr and _____ ± _____ °C accelerometer temperature. External gas leakage shall then be measured using a leak detector.

Or

The accelerometer shall be submerged in fluid and placed in a vacuum enclosure at _____ ± _____ torr and _____ ± _____ °C temperature for a period of _____ minutes. The presence or absence of a flow of bubbles after _____ minutes shall be noted. Care must be taken to distinguish bubbles due to leakage from those due to absorbed gases on the outer surface.

10.1.7.5 *Test Results*
(1) *Fluid-Filled Accelerometer.* There shall be no evidence of leakage.
(2) *Gas-Filled Accelerometer.* The measured leak rate shall not exceed _____ cm³ helium per second or equivalent at standard conditions.

Or

There shall be no flow of bubbles after _____ minutes.

> In some cases other procedures may be more appropriate, such as the use of fluorescent tracers in fluids or the measurement of weight loss.

10.1.8 *Temperature Sensor Characteristics*

10.1.8.1 *Purpose.* The purpose of this test is to determine the accelerometer temperature sensor resistance and temperature coefficient at operating temperature.

10.1.8.2 *Test Equipment.* The following test equipment specified in Section 9.2 is required for this test:
   Temperature-controlled oven
   Resistance measuring equipment 10.1.8.3 *Test Setup.* The accelerometer shall be placed in a temperature-controlled oven. All accelerometer circuits shall be de-energized.

10.1.8.4 *Test Procedure*
(1) *Resistance at Operating Temperature.* Stabilize the accelerometer temperature at _____ ± _____ °C (normal operating temperature). Measure the resistance of the temperature sensor using the resistance measuring equipment. The power applied to the temperature sensor shall be _____ ± _____ W.
(2) *Temperature Coefficient.* Repeat Step (1) for the following accelerometer temperatures: _____ and _____ ± _____ °C > Select temperatures above and below the operating temperature.

10.1.8.5 *Test Results.* The resistance of the sensor at the nominal perating temperature shall be _____ ± _____ Ω. From the ff-nominal temperature data compute the change in resistance per unit temperature. The result shall be _____ ± _____ Ω/°C.

> If the accelerometer utilizes a thermostatic temperature control instead of a resistive sensor, the temperature at which the device opens on a rising temperature and closes on a falling temperature should be measured. The rate of temperature change should also be specified.

10.1.9 *Power Stress*

10.1.9.1 *Purpose.* The purpose of this test is to assure circuit integrity under conditions of maximum power dissipation.

10.1.9.2 *Test Equipment Required.* The following test equipment specified in Section 9.2 is required for these tests:
Accelerometer mounting fixture
Pickoff power supply
Temperature control amplifier
Rms voltmeter
Ac voltage supply
Precision resistor
Dc voltmeter
Dc voltage supply 10.1.9.3 *Test Setup.* The test setup shall be in accordance with Section 10.1.3.

10.1.9.4 *Test Procedure*

(1) Apply _____ ± _____ V at _____ Hz across the series combination of the precision resistor and the warmup heater. Record the voltage across the precision resistor and across the warmup heater winding after _____ seconds. Remove the applied voltage.

(2) Apply _____ ± _____ V at _____ Hz across the series combination of the precision resistor and across the control heater. Record the voltage across the precision resistor and across the control heater winding after _____ seconds. Remove the applied voltage.

(3) Activate the temperature control loop and allow the instrument to reach operating temperature before proceeding with the following tests.

(4) Connect a _____ Ω resistor across the pickoff secondary. Apply _____ ± _____ V at _____ Hz across the series combination f the precision resistor and the pick ff primary. Record the voltage across the pick ff primary and across the precision resistor after _____ seconds. Remove the applied voltage.

(5) Apply _____ ± _____ V dc across the series combination of the precision resistor and the torquer. Record the voltage across the torquer and across the precision resistor after _____ seconds. Remove the applied voltage.

10.1.9.5 *Test Results.* The voltage readings shall be as follows.

(1) *Warmup Heater Winding*
Voltage across warmup heater _____ ± _____ V
Voltage across resistor _____ ± _____ V
(2) *Control Heater*
Voltage across control heater _____ ± _____ V
Voltage across resistor _____ ± _____ V
(3) *Pickoff*
Voltage across pickoff _____ ± _____ V
Voltage across resistor _____ ± _____ V
(4) *Torquer*
Voltage across torquer _____ ± _____ V
Voltage across resistor _____ ± _____ V > Care must be taken in the selection of voltage levels, exposure time periods, and mounting provisions.

10.2 Operative Open-Loop Tests. These tests are intended to determine the pertinent open-loop characteristics prior to operating the instrument in the closed-loop mode.

10.2.1 *Test Setup*

(1) Unless otherwise specified, the accelerometer shall be operated under the standard test conditions of Section 9.1 for operative open-loop tests (2) With the rotation axis of the dividing head horizontal within _____ ' (minutes — plane angle), attach the mounting fixture to the face plate of the dividing head so that the accelerometer when mounted will satisfy the requirements of (3)

(3) With the dividing head set at 0° ± _____ [', "], mount the accelerometer on the reference mounting [surface, surfaces] so that the input reference axis is horizontal within _____ [', "], the positive pendulous axis points downward, the output reference axis is parallel to the rotation axis f the head within _____ [', "], and the positive input reference axis points upward when the head is r tated to the 90° position (4) The acceler meter and test equipment shall be brought to operating condition in accordance with the procedure of Section 9.3.1.

(5) The accelerometer and the immediate environment (including the dividing head) shall be allowed to reach thermal equilibrium before proceeding with the test

10.2.2 Electrical Null 10.2.2.1 *Purpose.* The purpose of this test is to determine the minimum output voltage of the pickoff.

10.2.2.2 *Test Equipment Required.* The following test equipment specified in Section 9.2 is required for these tests:
- Dividing head and mounting fixture
- Pickoff power supply
- Temperature control amplifier
- Ac rms voltmeter
- Oscilloscope 10.2.2.3 *Test Setup.* The test setup shall be in accordance with Section 10.2.1.

10.2.2.4 *Test Procedure.* Rotate the dividing head until the minimum rms output voltage is obtained. Measure and record the voltage.

10.2.2.5 *Test Results.* The minimum output shall be less than _____ V rms.

> In some cases it may be desirable to measure the fundamental, its harmonics, and quadrature.

10.2.3 Pickoff Characteristics 10.2.3.1 *Purpose.* The purpose of this test is to determine the phase relationships among the pickoff excitation, input acceleration, and output voltage, and also the maximum pickoff voltage.

10.2.3.2 *Test Equipment Required.* The following test equipment specified in Section 9.2 is required for these tests:
- Dividing head and mounting fixture
- Pickoff power supply
- Temperature control amplifier
- Rms voltmeter
- Phase angle voltmeter
- Oscilloscope 10.2.3.3 *Test Setup.* The test setup shall be in accordance with Section 10.2.1.

10.2.3.4 *Test Procedure*

(1) Rotate the dividing head in the positive direction (increasing angle) from th 0° position until a pickoff utput of _____ ± _____ V rms is attained. Measure and record the phase angle of the output voltage with respect to the pickoff excitation (2) Continue rotating the dividing head in the positive direction until the maximum output voltage is reached. Measure and rec rd the rms output voltage (3) Return the dividing head to the 0° position and repeat the above procedure for the negative direction of rotation 10.2.3.5 *Test Results*

(1) For the positive direction of rotati n. the pickoff output voltage shall [lead, lag] the pickoff excitation by _____ ± _____ °

(2) For the negative direction of rotati n. the pickoff output voltage shall [lag, lead] the pickoff excitation by _____ ± _____ °

(3) The maximum rms output voltage in each case shall be greater than _____ V.

10.2.4 Torquer and Self-Test Torquer Polarity 10.2.4.1 *Purpose.* The purpose of thes tests is to determine the relationship between specified currents applied to the torquer and self-test torquer coils and the resulting pendulum motion as evidenced by the pickoff output.

10.2.4.2 *Test Equipment Required.* The following test equipment specified in Section 9.2 is required for these tests:
- Dividing head and mounting fixture
- Pickoff power supply
- Temperature control amplifier
- Dc voltmeter
- Phase angle voltmeter
- Oscilloscope
- Dc current supply 10.2.4.3 *Test Setup.* The test setup shall be in accordance with Section 10.2.1.

10.2.4.4 *Test Procedure*

(1) Connect the dc current supply to the torquer such that terminal _____ is positive with respect to terminal _____ for positive torquing. Increase the current to _____ ± _____ A > Specify a test current which will not damage the accelerometer but is sufficient to drive the pendulum against the stop.

(2) Measure and record the phase f the pickoff output v ltage relative to the pickoff excitation (3) Repeat Step (2) with the torquer current reversed (4) Connect the dc supply to the self-test torquer so that terminal _____ is positive with respect to terminal _____. Increase the current to _____ ± _____ A (5) Measure and record the phase of the pickoff output voltage relative to the pickoff excitation (6) Repeat Step (5) with the self-test torquer current reversed 10.2.4.5 *Test Results*

(1) From Section 10.2.4.4(2) the pickoff output voltage shall [lead, lag] the pickoff excitation voltage by _____ ± _____ °

(2) From Section 10.2.4.4(3) the pickoff output voltage shall [lag, lead] the pickoff excitation voltage by _____ ± _____ °

(3) From Section 10.2.4.4(5) the pickoff output voltage shall [lead, lag] the pickoff excitation (4) From Section 10.2.4.4(6) the pickoff output voltage shall [lag, lead] the pickoff excitation 10.2.5 *Frequency Response*

10.2.5.1 *Purpose.* The purpose of this test is to determine the accelerometer open-loop frequency response.

10.2.5.2 *Test Equipment Required.* The following test equipment specified in Section 9.2 is required for these tests:

Dividing head and mounting fixture
  Pickoff power supply
  Temperature control amplifier
  Rms voltmeter
  Phase angle voltmeter
  Oscilloscope
  Signal generator
  Amplifier/demodulator
  Precision current-sensing resistor 10.2.5.3 *Test Setup.* The test setup shall be in accordance with Section 10.2.1 except that the amplifier/demodulator shall be connected to the pickoff output.

10.2.5.4 *Test Procedure*

(1) Rotate the dividing head until the demodulator output is nulled within _____ V. Apply a sinusoidal signal of _____ ± _____ V and _____ ± _____ Hz across a series combinati n of the precision current-s nsing resist r and the torquer. Measure and record the voltage across the resistor, the demodulator utput, and the phase angle between these two voltages (2) Repeat the above step for the following frequencies: _____ Hz, _____ Hz, ··· , _____ Hz 10.2.5.5 *Test Results.* Calculate the ratio in dB of the demodulator output voltage to the input voltage measured across the resist r. Plot the phase and gain versus frequency on a semilog chart. Determine $f_1$ and $f_2$, the frequencies corresponding to phase shifts of 45° and 135°, respectively.

The value of $f_1$ shall be less than _____ Hz.

The value of $f_2$ shall be between _____ and _____ Hz.

> The frequency characteristics of the amplifier/demodulator must be considered (and if necessary compensated for) when performing this test.
>
> Note that generally the undamped natural frequency is
>
> $f_n = \sqrt{f_1 f_2}$ 10.3 Operative Closed-Loop Tests. Thes tests are intended to determine the closed-loop performance characteristics.

> In the tests which follow, the accelerometer output measurement test equipment and technique may significantly influence the test results and therefore should be carefully specified.

10.3.1 *Test Setup*

10.3.1.1 *Mounting Position 1*

(1) Unless otherwise specified, the accelerometer shall be operated under the standard test conditions of Section 9.1 for operative closed-loop tests (2) With the rotation axis of the dividing head horizontal within _____ °, attach th mounting fixture to the face plate of the dividing head so that the accelerometer when mounted will satisfy the requirements of (3)

(3) With the dividing head set at 0° ± _____ °, mount the accelerometer on the reference m unting [surface, surfaces] so the input reference axis is h rizontal within ___*, the positive pendulous reference axis points upward, the utput reference axis is parallel to the rotation axis of the head within ___'. and the positive input r ference axis points upward when the head is rotated to the 90° position (4) The accelerometer and test equipment shall be brought to operating condition in accordance with the procedure of Section 9.3.2

(5) With the dividing head set at 90°, the accelerometer and the immediate environment (including the dividing head) shall be allowed to reach thermal equilibrium as evidenced by the stability of the accelerometer output being within ___ output units for ___ measurements spaced ___ minutes apart before proceeding with the test

10.3.1.2 Mounting Position 2

(1) Unless otherwise specified, the accelerometer shall be operated under the standard test conditions of Section 9.1 for operative closed-loop tests (2) With the rotation axis of the dividing head horizontal within ___°, attach the mounting fixture to the face plate so that the accelerometer when mounted will satisfy the requirements of (3)

(3) With the dividing head set at 0° ± ___°, mount the accelerometer on the reference mounting [surface, surfaces] so that the input reference axis is horizontal within ___°, the positive output reference axis points downward, the pendulous reference axis is parallel to the rotation axis of the head within ___', and the positive input reference axis points upward when the head is rotated to the 90° position (4) The accelerometer and test equipment shall be brought to operating condition in accordance with the procedure of Section 9.3.2

(5) With the dividing head set at 90°, the accelerometer and the immediate environment (including the dividing head) shall be allowed to reach thermal equilibrium as evidenced by the stability of the accelerometer output being within ___ output units for ___ measurements spaced ___ minutes apart before proceeding with the test

10.3.2 Scale Factor and Bias

10.3.2.1 Purpose. The purpose of this test is to determine the apparent bias $K_0$ and the apparent scale factor $K_1$

10.3.2.2 Test Equipment. The following equipment specified in Section 9.2 is required for this test:

Dividing head and mounting fixture
Electronic equipment required to operate the accelerometer and to measure its output

10.3.2.3 Test Setup. The test setup shall be in accordance with Section 10.3.1.1.

10.3.2.4 Test Procedure

(1) Rotate the dividing head to the 90° position (input reference axis up) within ___'. Record the accelerometer output as $E_{90}$ (2) Rotate the dividing head to the 270° position (input reference axis down) within ___'. Record the accelerometer output as $E_{270}$ (3) Calculate $K_1$ and $K_0$ using the foll wing algebraic equations:

$$K_1 = \frac{E_{90} - E_{270}}{2} \quad \text{output units/g} \quad \text{(Eq 1)}$$

$$K_0 = \frac{E_{90} + E_{270}}{2K_1} \quad g \quad \text{(Eq 2)}$$

> The apparent bias and scale factor obtained by the above method include the effects of the second-order term $K_2$ and the third-order term $K_3$, respectively. Se Appendix B.
>
> An alternate method of measuring bias is to obtain accelerometer outputs at the other two cardinal positions. This valu represents the bias with (nominally) no acceleration applied along the input axis, and is
>
> $$K_0 = \frac{E_0 + E_{180}}{2K_1} \, g$$
>
> where $E_0$ and $E_{180}$ are the accelerometer outputs measured in the two horizontal positions. The two positions must be 180° apart within 1° for each 2.5 μg allowable uncertainty in the bias measurement.

10.3.2.5 Test Results. The apparent scale factor and apparent bias shall conform to the following requirements:

$K_1 = $ ___ ± ___ output units/g
$|K_0| \leq $ ___ g

10.3.3 Pickoff Scale Factor and Pendulum Elastic Restraint

10.3.3.1 Purp se. The purpose of these tests is to determine the pickoff voltage change and the pendulum elastic restraint change as functions of pendulum angular displacement.

> *Pickoff Scale Factor.* The pickoff scale factor is the output voltage change as a function of pendulum displacement.
> *Pendulum Elastic Restraint.* This includes all restraints such as flex lead spring restraints, pivot spring restraints, and pickoff reaction torque restraints, but it does not include the principal restraint (rebalance torque supplied by the servo loop).

10.3.3.2 Test Equipment Required. The following test equipment specified in Section 9.2 is required for these tests:
  Dividing head and mounting fixture
  Electronic equipment required to operate the accelerometer and to measure its output
  Phase angle voltmeter
  Dc voltmeter
  Variable dc power supply

10.3.3.3 Test Setup. The test setup shall be in accordance with Section 10.3.1.1, except that the electrical connections shall be modified to conform to Fig 3.

10.3.3.4 Test Procedure

(1) Reduce the capture electronics gain to _____ ± _____ V dc/V rms. Position the dividing head at 0° (input axis nominally horizontal). Turn on the dc voltage supply and increase its output to _____ ± _____ V which will displace the pendulum a suitable amount about the positive output axis direction + $\theta$ (2) Measure and record the accelerometer output as $E_a$ and the pickoff output in-phase voltage as $V_a$ > The amplifier must be operating in its nonsaturated region. Sets of points may be taken at varying displacements to determine pickoff and elastic restraint linearity.

(3) Decrease the output of the dc supply to zero. Reverse its polarity and increase its output t the same v ltage to offset the pendulum in the negative direction − $\theta$. Measure and record the accelerometer output as $E_b$ and measure the pickoff in-phase output as $V_b$ (4) Rotate the dividing head 180° ± _____°. Turn on the dc voltage supply and increase its output to the same voltage as in Step (1). Measure and record the accelerometer output reading as $E_c$ and measure the pickoff output in-phase voltage as $V_c$ (5) Utilizing the procedure described in Step (3), reverse the output of the dc supply and measure and record the accelerometer output as $E_d$ and measure the pickoff in-phase output as $V_d$

10.3.3.5 Test Results

(1) Calculate the input axis deviation $\gamma$ about the output axis for each of the two modes of operation using the following equations:

$$\gamma_{+\theta} = \frac{E_a - E_d}{2K_1} \text{ rad}$$

$$\gamma_{-\theta} = \frac{E_b - E_c}{2K_1} \text{ rad}$$

where $K_1$ is the nominal accelerometer scale factor in output units/g (2) Compute the pendulum elastic restraint $K_r$ and the pickoff scale factor $K_{po}$ using the following equations:

$$K_r = \left[\frac{(E_a + E_d) - (E_b + E_c)}{\gamma_{+\theta} - \gamma_{-\theta}}\right] \frac{1}{2K_1} \text{ g/rad}$$

$$K_{po} = \frac{1}{2}\left[\frac{(V_a + V_d) - (V_b + V_c)}{\gamma_{+\theta} - \gamma_{-\theta}}\right] \text{ V/rad}$$

(3) The values calculated in (2), shall meet the following requirements:
$K_r = $ _____ ± _____ g/rad
$K_{po} = $ _____ ± _____ V/rad > An alternate method of conducting this test is to-sum an ac voltage with the pickoff output voltage to effectively shift the pickoff null position.

Test Circuit for Measurement of Pickoff Scale Factor
and Pendulum Elastic Restraint

10.3.4 Input-Axis Misalignment

10.3.4.1 Purpose. The purpose of this test is t determine the misalignment of the input axis with respect to the input reference axis (IRA). The IRA is defined by external marks or mounting (surface, surfaces) or both, on the accelerometer case.

10.3.4.2 Test Equipment. The following test equipment specified in Section 9.2 is required for this test:
 Dividing head and mounting fixture
 Electronic equipment required to operate the accelerometer and to measure its output

10.3.4.3 Test Setup — Mounting Position 1. The test setup shall be in accordance with Section 10.3.1.1.

10.3.4.4 Test Procedure — Mounting Position 1
(1) With the dividing head set at 0°, record the accelerometer output as $E_0$
(2) Rotate the dividing head 180° ± ___
and record the accelerometer output as $E_{180}$
(3) Calculate the misalignment angle $\delta_0$ using the following equation:

$$\delta_o = \frac{E_0 - E_{180}}{2K_1} \quad \text{rad}$$

where $\delta_o$ is the misalignment angle of the input axis with respect to the input reference axis about the output reference axis, in radians and $K_1$ is the nominal scale factor, in output units/$g$

10.3.4.5 Test Setup — Mounting Position 2. The test setup shall be in accordance with Section 10.3.1.2.

10.3.4.6 Test Procedure — Mounting Position 2
(1) With the dividing head set at 0°, record the accelerometer output as $E_0$
(2) Rotate the dividing head 180° ± ___
and record the accelerometer output as $E_{180}$
(3) Calculate the misalignment angle $\delta_p$ using the following equation:

$$\delta_p = \frac{E_{180} - E_0}{2K_1} \quad \text{rad}$$

where $\delta_p$ is the misalignment angle of the input axis with respect to the input reference axis about the pendulous reference axis, in radians The misalignment angles as btained above include angular errors f the mounting fixture, dividing head errors, and errors in mounting as well as the misalignment between the input reference axis and the input axis. There is no way of distinguishing between a misalignment and a cross axis sensitivity. An alternate method is to align the IRA parallel to the horizontal dividing head rotation axis, and to obtain measures of indicated acceleration at each of the four cardinal case positions.

10.3.4.7 Test Results. The values of $\delta_o$ and $\delta_p$ shall meet the following requirements:
$|\delta_o| \leq$ ___ rad
$|\delta_p| \leq$ ___ rad An alternative method is to specify the total misalignment angle:

$$\delta_t = \sqrt{\delta_o^2 + \delta_p^2}$$

10.3.5 Static Multipoint

10.3.5.1 Purpose. The purpose of the static multipoint test is to determine the coefficients of the assumed model equation by a series of measurements in a 1-$g$ field.

See Appendix B for a discussion on the static multipoint test and the data reduction procedure.

10.3.5.2 Test Equipment. The following test equipment specified in Section 9.2 is required for this test:
 Dividing head and mounting fixture
 Electronic equipment required to operate the accelerometer and to measure its output

10.3.5.3 Test Setup — Mounting Position 1. The test setup shall be in accordance with Section 10.3.1.1.

10.3.5.4 Test Procedure — Mounting Position 1. At each head angle $\theta = 0°, \theta_n, 2\theta_n, \ldots, k\theta_n, \ldots, (n-1)\theta_n$, take and record ___ measurements of the accelerometer output $E_{kp}$, where $\theta_n = 360/n$, $n$ and $k$ are integers, $n =$ ___, and $0 \leq k \leq n-1$. The dividing head angles shall be set within ___.

n is the number of test positi ns and its choice is usually based on statistical considerations.

Depending upon the desired test accuracy and the output characteristics of the particular accelerometer, the following items should be specified:
(1) Sequence of dividing head positions
(2) Instrument settling time allowed at each position
(3) Number of individual measurements at each position
(4) Averaging interval associated with each measurement
(5) Dividing head accuracy
(6) Pier stability 10.3.5.5 *Test Setup — Mounting Position 2.* The test setup shall be in accordance with Section 10.3.1.2.

10.3.5.6 *Test Procedure — Mounting Position 2.* At head angles $\theta = 0°, \theta_n, 2\theta_n, \cdots, k\theta_n, \cdots, (n-1)\theta_n$, take and record _____ measurements of the accelerometer output $E_{ko}$, where $\theta_n = 360/n$, $n$ and $k$ are integers, $n = $ _____, and $0 \leq k \leq n-1$. The dividing head angles shall be set within _____°.

10.3.5.7 *Test Results*
(1) From the above test data taken in the two mounting positions, compute the best estimate of each of the model equation coefficients, the uncertainties of the coefficients, and the unbiased estimate of the standard deviation of the residuals > Specify the data reduction procedure or the data reduction program to be used. See Appendix B for suggested data reduction procedures.

(2) The best estimate of the model equation coefficients and their uncertainties shall conform to the following requirements:

| Coefficient | Estimated Value | Maximum Uncertainty | Units |
|---|---|---|---|
| $K_0$ | — ± — | ____ | $g$ |
| $K_1$ | — ± — | ____ | output units/$g$ |
| $\|K_2\|$ | <— | ____ | $g/g^2$ |
| $\|K_3\|$ | <— | ____ | $g/g^3$ |
| $\|\delta_o\|$ | <— | ____ | rad |
| $\|\delta_p\|$ | <— | ____ | rad |
| $\|K_{ip}\|$ | <— | ____ | $(g/g)/$cross $g$ |
| $\|K_{io}\|$ | <— | ____ | $(g/g)/$cross $g$ |

(3) The standard deviation of the residuals shall n t exceed _____ $g$ 10.3.6 *Turn-On Hysteresis*

10.3.6.1 *Purpose.* The purpose of this test is to determine the displacement hysteresis associated with moving the pendulum from either stop to the operating null position as a result of power turn-on.

> The test will be conducted using reductions in loop gain in lieu of power turn-on to preclude any dithering effects from a sudden loop closure.

10.3.6.2 *Test Equipment.* The following test equipment specified in Section 9.2 is required for this test:
Dividing head and mounting fixture
Electronic equipment required to operate the accelerometer and to measure its output 10.3.6.3 *Test Setup.* The test setup shall be in accordance with Section 10.3.1.1, except that the torquing loop shall be open.

10.3.6.4 *Test Procedure*
(1) Rotate the dividing head to the 0° position and close the loop
(2) Rotate the dividing head to the 90° position
(3) Measure the accelerometer output $E_e$
(4) Reduce the servo loop gain smoothly, allowing the pendulum to move to the stop
(5) Smoothly reestablish the normal servo loop gain and measure the accelerometer output $E_t$
(6) Repeat Steps (2) through (5), except that the dividing head shall be rotated from the 0° position to the 270° position (pendulum falls to the other stop)
(7) Repeat Steps of (2) through (6) _____ times > The angle of the accelerometer with respect to the gravity vector may be varied to provide less than 1 $g$ along the input axis if desired.

10.3.6.5 *Test Results*
(1) Calculate the turn-on hysteresis for each set of data. Use the accelerometer's nominal scale factor for $K_1$ $$H_Y = \frac{E_o - E_t}{K_1} g$$

(2) For each test, the absolute value of the [mean, median] determination shall not exceed _____ g > The above test provides a measure of the variation in output associated with power turn-on or loop closure. Another type of hysteresis is the variation in output, at a given input, resulting from exercising the pendulous mass within its operating range (similar to magnetic hysteresis). To determine this characteristic, current injection or a similar technique may be employed to swing the pendulum back and forth through its operating range, without moving the instrument case. A plot of the restoring current versus the driving current on an $X$-$Y$ recorder will produce a hysteresis loop, the maximum opening of which is the operating hysteresis.

10.3.7 Threshold and Resolution 10.3.7.1 *Purpose.* The purpose of this test is to determine if the changes in instrument output are greater than the specified values for given acceleration level changes.

10.3.7.2 *Test Equipment.* The following test equipment specified in Section 9.2 is required for this test:
 Dividing head and mounting fixture
 Electronic equipment required to operate the accelerometer and to measure its output 10.3.7.3 *Test Setup.* The test setup shall be in accordance with Section 10.3.1.1.

10.3.7.4 *Test Procedures*
 (1) Threshold
  (a) Rotate the dividing head to the 0° position (zero g) within _____ °
  (b) Rotate the dividing head + _____ ° and record the accelerometer output
  (c) Rotate the dividing head − _____ ° from the 0° position and record the accelerometer output
  (d) Repeat Steps (b) and (c) _____ times (2) *Resolution.* Repeat Steps (a) through (d) of Section 10.3.7.4(1), except that the dividing head is rotated to induce input acceleration levels f ± 0.5 g and ± 1.0 g instead of 0 g. The angular increments at ± 0.5 g are to be ± _____ ° and at ± 1.0 g the angular increments are to be ± _____ °.

> Other or additional input acceleration levels may be utilized if desired.

10.3.7.5 *Test Results*
(1) *Computation.* Divide the individual readings by the nominal scale factor. Determine the output change (in g units) at each reference input acceleration level
(2) *Threshold.* The absolute value of the smallest change in the accelerometer output recorded in Section 10.3.7.4(1) shall exceed _____ g
(3) *Resolution.* The absolute value of the smallest change in the accelerometer output recorded in Section 10.3.7.4(2) shall exceed _____ g > The relationship of the resolution (or threshold) to the input reference angle and the angular increment is
>
> $$\Delta A_{ind} = \frac{\Delta E}{K_1} = g \cos \theta \, \Delta\theta$$
>
> where:
> $\Delta A_{ind}$ = desired resolution (or threshold)
> $\theta$ = angle between the positive input axis and the horizontal such that $g \sin\theta$ = reference input acceleration
> $\Delta\theta$ = angular increment in $\theta$, in radians
> The minimum threshold and resolution responses are usually specified to be greater than 50 percent of the expected output using the nominal scale factor.

10.3.8 Warmup Time 10.3.8.1 *Purpose.* The purpose of this test is to determine the time required for the accelerometer output to come within a specified value of the steady state or final indicated output following power turn-on in a specified ambient environment.

10.3.8.2 *Test Equipment.* The following test equipment specified in Section 9.2 is required for this test:

Dividing head and mounting fixture

Electronic quipment required to operate the acceler meter and to measure its utput Equipment required to establish the specified ambient envir nment 10.3.8.3 *Test Setup.* The test setup shall be in accordance with Sections 10.3.1.2 (1), (2), and (3) only, except that the initial ambient temperature shall be room temperature.

10.3.8.4 *Test Procedure*
(1) Set the dividing head at 0°
(2) Establish the ambient thermal environment at _____ ± _____ °C. Allow _____ minutes for the instrument to reach thermal equilibrium
(3) Energize the accelerometer and test equipment as quickly as possible in accordance with Sections 9.1.1 and 9.3.2
(4) Record the accelerometer output as a function of time until a steady state is reached 10.3.8.5 *Test Results*
(1) Plot the value of the accelerometer output as a function of time
(2) The output obtained from the test shall be within _____ output units of the steady-state value at the end of _____ minutes

---

In all cases, the initial thermal ambient environment and thermal mounting conditions must be carefully specified. Care must be taken to ensure that the specified thermal environment does not affect the dividing head positioning accuracy. For some applications. other orientations may be specified.

---

10.3.9 *Self-Test Torquer Scale Factor*

10.3.9.1 *Purpose.* The purpose of this test is to determine the scale factor of the self-test torquer.

10.3.9.2 *Test Equipment.* The following test equipment specified in Section 9.2 is required for this test:
Dividing head and mounting fixture
Electronic equipment required to operate the accelerometer and to measure its output
Dc current supply 10.3.9.3 *Test Setup.* The test setup shall be in accordance with Section 10.3.1.1, except that the dividing head shall be set at 0°.

10.3.9.4 *Test Procedure*
(1) Apply _____ ± _____ mA dc to the self-test torquer winding. Record the accelerometer output as $E_h$

---

Specify a current which will not damage the accelerometer nor cause the pendulum to hit a stop.

---

(2) Reverse the polarity of the applied self-test torquer current. Record the accelerometer output as $E_j$
(3) Calculate the self-test torquer scale factor $K_s$ by $$K_s = \frac{2I_s K_1}{E_h - E_j} \text{ mA/g}$$

where
$K_s$ = self-test scale factor, in mA/g
$I_s$ = self-test current, in mA
$E_h$, $E_j$ = accelerometer outputs, in output units
$K_1$ = accelerometer scale factor obtained from Section 10.3.2, in output units/g 10.3.9.5 *Test Results.* The self-test torquer scale factor shall be _____ ± _____ mA/g.

10.3.10 *Short-Term Stability*
10.3.10.1 *Purpose.* The purpose of this test is to determine the short-term stability of the accelerometer bias $K_0$ and scale factor $K_1$.

10.3.10.2 *Test Equipment.* The following test equipment specified in Section 9.2 is required for this test:
Dividing head and mounting fixture
Electronic equipment required to operat the accelerometer and to measure its output 10.3.10.3 *Test Setup.* The test setup shall be in accordance with Section 10.3.1.1.

10.3.10.4 *Test Procedure*
(1) Stabilize the accelerometer at the standard operating conditions specified in Secti n 9.1
(2) Determine and record the bias and scale factor using the procedure of Section 10.3.2.4
(3) Repeat Step (2) _____ times per day for _____ [hours, days] of continuous operation. Measurements to be made at least _____ [minutes, hours] apart 10.3.10.5 *Test Results.* Determine the standard deviation of the bias and scale fact r from their mean values obtained in Section 10.3.10.4.
(1) The short-term standard deviation of the bias shall be less than _____ g
(2) The short-term standard deviation of the scale factor shall be less than _____ output units/g > In s me applicati ns it may be desirable to modify the test to determine the stability of additional parameters such as input-axis misalignment.
>
> Other criteria for establishing stability may be utilized such as the unbiased estimate of the standard deviation, curve fitting for trend determinations, or computer analyses to determine the autocorrelation times.

10.3.11 Long-Term Stability 10.3.11.1 *Purpose.* The purpose of this test is to determine the long-term stability of the accelerometer bias $K_0$ and scale factor $K_1$.

10.3.11.2 *Test Equipment.* The following test equipment specified in Section 9.2 is required for this test:

Dividing head and mounting fixture

Electronic equipment required to operate the accelerometer and to measure its output 10.3.11.3 *Test Setup.* The test setup shall be in accordance with Section 10.3.1.1.

10.3.11.4 *Test Procedure*

(1) Stabilize the accelerometer at the standard operating conditions specified in Section 9.1

(2) Determine and record the bias and scale factor using the procedure of Section 10.3.2.4

(3) Repeat Step (2) _____ times per day for _____ days of continuous operation. Measurements to be made at least _____ [minutes, hours] apart.

10.3.11.5 *Test Results.* Obtain the best fit linear curves to the bias and scale factor data points of Section 10.3.11.4 by the method of least squares. Determine the standard deviation of the data points from the best fit lines.

(1) The slope of the best fit bias line shall not exceed _____ g/day (2) The standard deviation of the bias data points from the best fit line shall be less than _____ g (3) The slope of the best fit scale factor line shall not exceed _____ output units/g per day (4) The standard deviation of the scale factor data points from the best fit line shall be less than _____ output units/g > In some applications, it may be desirable t modify the t st to determin the stability of additional parameters such as input-axis misalignment.

10.3.12 Repeatability 10.3.12.1 *Purpose.* The purpose of this test is to determine the repeatability of the bias $K_0$ and the scale factor $K_1$ with cool downs to the specified temperature.

10.3.12.2 *Test Equipment.* The following test equipment specified in Section 9.2 is required for this test:

Dividing head and mounting fixture

Electronic equipment required to operate the accelerometer and to measure its output 10.3.12.3 *Test Setup.* The test setup shall be in accordance with Section 10.3.1.1.

10.3.12.4 *Test Procedure*

(1) Stabilize the accelerometer at the standard operating conditions specified in Section 10.3.1.1

(2) Determine and record the bias and scale factor using the procedure of Section 10.3.2.4

(3) Deenergize and cool the accelerometer to _____ ± _____ °C. Soak at least _____ hours (4) Repeat Steps (1), (2), and (3) _____ times 10.3.12.5 *Test Results*

(1) The rms deviation of the bias measurements from the mean value shall not exceed _____ g (2) The rms deviation of the scale factor measurements from the mean value shall not exceed _____ output units/g > Other changes in environmental conditions may be specified as desired.

10.3.13 Sensitivity 10.3.13.1 *Purpose.* The purpose of the sensitivity test is to determine the changes in accelerometer scale factor $K_1$ and bias $K_0$ caused by variations in the following:

(1) Pickoff excitation voltage
(2) Pickoff excitation frequency
(3) Ambient temperature
(4) External magnetic fields
(5) Pressure
(6) Operating temperature For some applications it may be desirable to increase or reduce the number of test conditions to be varied and to test for the sensitivity of other accelerometer parameters such as input-axis misalignment.

10.3.13.2 Test Equipment. The following test equipment specified in Section 9.2 is required for this test:
Dividing head and mounting fixture
Electronic equipment required to operate the accelerometer and to measure its output
Equipment required to produce the excitation variations and environmental changes

10.3.13.3 Test Setup. The test setup shall be in accordance with Section 10.3.1.1.

10.3.13.4 Test Procedure

This test is performed by varying each parameter individually while maintaining all other test conditions constant per the requirements of Section 9.1. An example is presented below.

*Pickoff Excitation Voltage*
(1) Determine the accelerometer scale factor and bias per Section 10.3.2 with the pickoff excitation increased to _____ ± _____ V
(2) Decrease the pickoff excitation to _____ ± _____ V and repeat the test

*Other Parameter Variations.* Repeat the test described in Section 10.3.13.4(1) for each parameter listed in Section 10.3.13.1.
Select the appropriate parameter change for each test.
Generally the conditions of environmental exposure should be specified such as rate of temperature and pressure changes and the direction of the magnetic fields. Care must be taken to separate or eliminate the effect of changes in test equipment characteristics caused by variations in environment.

10.3.13.5 Test Results

The test data shall be reduced in order to determine the sensitivity coefficients. An example of an accelerometer sensitivity coefficient calculation is as follows.

(1) The scale factor sensitivity with variations of pickoff excitation voltage is $$\frac{100 (K_{1a} - K_{1b})}{K_1 (V_a - V_b)} \text{ percent/V}$$

where:
$V_a$ = maximum pickoff excitation
$V_b$ = minimum pickoff excitation
$K_{1a}$ = scale factor measured with $V_a$ applied
$K_{1b}$ = scale factor measured with $V_b$ applied
$K_1$ = nominal scale factor (2) The bias sensitivity with variations of pickoff excitation is $$\frac{K_{0a} - K_{0b}}{V_a - V_b} \text{ g/V}$$

where:
$K_{0a}$ = bias measured with $V_a$ applied
$K_{0b}$ = bias measured with $V_b$ applied Determine the other sensitivity coefficients in a similar manner.

(3) The sensitivity coefficients shall be equal to or less than the following limits:

| Parameter | Sensitivity | |
|---|---|---|
| | Scale Factor | Bias |
| Pickoff excitation voltage | ___ percent/V | ___ g/V |
| Pickoff excitation frequency | ___ percent/Hz | ___ g/Hz |
| Operating temperature | ___ percent/°C | ___ g/°C |
| External magnetic fields | ___ percent/T | ___ g/T |
| Pressure | ___ percent/(N/m²) | ___ g/(N/m²) |
| Ambient temperature | ___ percent/°C | ___ g/°C |

Note that if a particular sensitivity is nonlinear, the result obtained from the above procedure can be misleading. It may be desirable to obtain more data points in order to determine such characteristics as linearity, maximum slope, or hysteresis.

10.3.14 Centrifuge Input Range

10.3.14.1 Purpose. The purpose of this test is to establish that the instrument input acceleration range is equal to or greater than the specified value.

10.3.14.2 Test Equipment. The following equipment specified in Section 9.2 is required for this test:
Mounting fixture
Electronic equipment required to operate the accelerometer and to measure its output
Centrifuge

10.3.14.3 Test Setup — Mounting Position A

(1) Unless otherwise specified. the accelerometer shall be operated under the standard test conditions of Section 9.2 for operative closed-loop tests (2) The axis of rotation of the centrifuge shall be vertical within _____.

(3) Attach the accelerometer to the mounting fixture on the centrifuge arm with the input reference axis normal to the centrifuge axis within _____' and pointing toward the rotation axis (positive input acceleration). Determine and record the nominal radius from the centrifuge axis to the proof mass center of gravity within _____ inches.

(4) Starting Procedure

> State sequence of operations required to bring accelerometer and test equipment to operating conditions.

(5) The accelerometer and the immediate environment shall be allowed to reach thermal equilibrium as evidenced by the stability of the accelerometer output within _____ output units for _____ measurements spaced _____ minutes apart before proceeding with the test

10.3.14.4 Test Procedure — Mounting Position A

(1) Apply a centripetal acceleration of ± _____ g (2) Record the accelerometer output and the rms pickoff output voltage

10.3.14.5 Test Setup — Mounting Position B. Same as Section 10.3.14.3. except that the direction of the input reference axis shall be reversed (negative input acceleration).

10.3.14.6 Test Procedure — Mounting Position B. Same as Section 10.3.14.4.

10.3.14.7 Test Results. The absolute values f the acceler meter outputs from the two tests shall each be _____ ± _____ output units. The pickoff voltages shall each be less than _____ V rms.

10.3.15 Precision Centrifuge

10.3.15.1 Purpose. The purpose of this test is to determine the magnitude of the nonlinear acceleration-sensitive model equation coefficients $K_2$ and $K_3$.

> Precision centrifuge tests are usually not required for instruments with low input ranges (for example. less than ± 2 g).

10.3.15.2 Test Equipment. Same as Section 10.3.14.2, except use a precision centrifuge and timing equipment to measure the centrifuge period.

10.3.15.3 Test Setup — Mounting Position A

(1) Unless otherwise specified. the accelerometer shall be operated under the standard test conditions of Section 9.2 for operative closed-loop tests (2) The axis of rotation of the centrifuge shall be vertical within _____°

(3) Attach the accelerometer to the mounting fixture on the centrifuge arm with the input reference axis normal to the centrifuge axis within _____' and pointing toward th rotation axis (positive input acceleration). Determine and record the nominal radius from the centrifuge axis to the proof mass center of gravity (4) Starting Procedure > State sequence of operations required to bring accelerometer and test equipment to operating conditions.

10.3.15.4 Test Procedure — Mounting Position A

(1) Set the centrifuge angular rate to a value equivalent to a centripetal acceleration at the accelerometer proof mass of _____ g, nominally (2) Measure the accelerometer output and the centrifuge period simultaneously and record (3) Repeat Steps (1) and (2) at nominal centripetal acceleration levels of _____, _____, _____, ..., and _____ g

10.3.15.5 Test Setup — Mounting Position B. Same as S cti n 10.3.15.3, except that the direction of the input reference axis shall be r versed (negative input acceleration).

10.3.15.6 Test Procedure — Mounting Position B. Same as Section 10.3.15.4.

> Additional orientations of the accelerometer with respect to the centripetal acceleration vector may be specified, if desired, in order to determine the cross-coupling or other model equation coefficients.

10.3.15.7 Test Results. Perform a regression analysis of the input versus indicated acceleration data in order to obtain values of the nonlinear acceleration-sensitive model equation coefficients and the test residuals. The resulting coefficients shall conform to the following:

$K_2 \leq$ _____ $g/g^2$
$K_3 \leq$ _____ $g/g^3$ and so on.

The standard deviation of the residuals shall be less than _____ $g$.

> The measurement precision is directly related to the test accuracy desired, and careful attention must be given to these considerations when designing a centrifuge test. In some cases it may be necessary to measure the arm compliance (arm bending and change in arm length) which occurs between the test acceleration levels. Equipment to perform these measurements is usually provided as part of the centrifuge apparatus. The test procedure or the regression analysis, or both, must be designed to minimize the impact of these effects as well as uncompensated changes in centrifuge radius and accelerometer attitude relative to gravity which might occur between the positive (input axis in) and negative (input axis out) halves of the test. If these effects are not removed or compensated for, large errors in the derived values of the model equation coefficients can occur.
>
> Examine the residuals (differences between the actual data points and the fitted curves) in order to verify that the model equation utilized reasonably reflects the accelerometer response.

10.3.16 Life, Storage

10.3.16.1 Purpose. The purp se f this test is to demonstrate storage life of the accelerometer.

10.3.16.2 Test Equipment. The following test equipment specified in Section 9.2 is required for this test:

Dividing head and mounting fixture
Electronic equipment required to operate the accelerometer and to measure its output

10.3.16.3 Test Setup. The setup for checking the accelerometer at the beginning and end of the test period shall be in accordance with Section 10.3.1.1.

10.3.16.4 Test Procedure

(1) Determine the bias and scale factor using the procedure of Section 10.3.2

(2)
> Specify the storage environment which may include periodic subjection to vibration, shock, temperature cycling, and/or other nonoperating environmental conditions. Specify storage time and any protective packaging requirements.

(3) At the end of the storage period, again determine the bias and scale factor.

> If desired, periodic measurements of performance parameters during storage life may be specified.

10.3.16.5 Test Results. The bias and scale factor values for all measurements shall meet the following requirements:

$|K_0| \leq$ _____ $g$
$K_1 =$ _____ $\pm$ _____ output units/g

10.3.17 Life, Operating

10.3.17.1 Purpose. The purpose of this test is to demonstrate the operating life of the acceler meter.

Fig 4 Suggested Accelerometer Environmental and Test Combinations 10.3.17.2 *Test Equipment.* The foll w-ing test equipment specified in Section 9.2 is required for this test:
   Dividing head and mounting fixture
   Electronic equipment required to operate the accelerometer and to measure its output
   10.3.17.3 *Test Setup.* The test setup shall be in accordance with Section 10.3.1.1.
   10.3.17.4 *Test Procedure.* Every _____ days for _____ [days..months] measure the bias, scale factor, and misalignment angle using the procedure of Section 10.3.2 and 10.3.4 in mounting position 1.
   10.3.17.5 *Test Results.* The bias, scale factor, and misalignment angle shall meet the following requirements:

$|K_o| \leq $ _____ g
$K_1 = $ _____ $\pm$ _____ output units/g
$|\delta_o| \leq $ _____ rad

10.4 Environmental Tests 10.4.1 *Purpose.* The purpose of these tests is to verify that the accelerometer performs as specified when subjected to environments outside of the standard operating conditions, but within the specified environmental limits.
   10.4.2 *Test Equipment.* The following test equipment from Section 9.2 must be included for each environmental test:

Equipment for providing the specified environment
   Means of measurement of environment and time
   Adaptation of accelerometer to environmental equipment such as special holding fixtures, cables, etc.
   Equipment for each accelerometer test, chosen from Sections 10.1, 10.2, and 10.3.

10.4.3 *Test Procedure and Results*

Detail th procedure f r the control of the environment, including tolerances and rates of change, integrated with the procedure for the accelerometer test. Caution notes on overload limits on the environmental intensity applied to the accelerometer can be specified if required. Compliance with the specification performance requirements should be demonstrated prior to, during if appropriate, and upon completion of the environmental test sequence.

Procedures for most environmental tests are well covered by existing industry, government, and military documents such as MIL-E-5272, Environmental Testing, Aeronautical and Associated Equipment. Rather than duplicate samples of existing procedures, this standard provides assistance in selecting the accelerometer parameters which will be most important to measure in each environment. (See Fig 4.) This selection is made based on the expected environmental sensitivities of the accelerometer and the cost-effectiveness of the testing.

The application of the accelerometer will determine which tests, or combination of tests, are to be performed, and their sequence. The figure is intended as a guide for selection of the accelerometer test which should be conducted in association with the environmental tests that are chosen dependent on the application of the accelerometer. In some cases it may be desirable to combine environments in order to simulate the expected operating conditions.

48

Appendix A
Accelerometer Dynamic Equations

A1. Introduction

This Appendix presents the equations and block diagrams of the dynamic response of the accelerometer when operating in both the open- and closed-loop modes. In each case, an idealized linear second-order model is assumed for the accelerometer pendulum.

A2. Open-Loop Operation

If the accelerometer is driven open-loop with a voltage $v_i(t)$ applied to the torquer (and the input acceleration is assumed to be zero), the output voltage is approximated by the following equation (see Fig A1):

$$V_o(s) = V_i(s) \left[\frac{K_t}{R + Ls}\right] \left[\frac{1}{Js^2 + Cs + K_e}\right] \cdot \left[K_{po}(s)\right] \left[K_A(s)\right] \quad \text{(Eq A1)}$$

where
- $v_i(t)$ = applied voltage, in volts
- $V_i(s)$ = Laplace transform of $v_i(t)$
- $V_o(s)$ = Laplace transform of output voltage, in volts
- $K_t$ = torquer scale factor, in dyn · cm/A
- $R$ = torquer resistance, in ohms
- $L$ = torquer inductance, in henrys
- $s$ = Laplace operator
- $J$ = moment of inertia of pendulum about output axis, in g · cm²
- $C$ = damping torque coefficient, in dyn · cm/(rad/s)
- $K_e$ = pendulum elastic restraint, in dyn · cm/rad
- $K_{po}(s)$ = pickoff transfer function, in V/rad
- $K_A(s)$ = torque balance electronics transfer function, in V dc/V rms
- $T_i(s)$ = Laplace transform of driving torque, in dyn · cm
- $\theta_{po}(s)$ = Laplace transform of angular displacement of pendulum with respect to case, in radians
- $V_{po}(s)$ = Laplace transform of pickoff voltage, in V rms

A3. Closed-Loop Operation

Assuming that the accelerometer case is subjected to an acceleration $a(t)$ along the input axis, the output voltage may be approximated by the following equation (see Fig A2):

$$V_o(s) = A(s) \frac{P K_{po}(s) K_A(s) (R + Ls)}{(Js^2 + Cs + K_e)(R + Ls) + K_{po}(s) K_A(s) K_t} \quad \text{(Eq A2)}$$

where
- $a(t)$ = applied acceleration along input axis in g
- $A(s)$ = Laplace transform of $a(t)$
- $P$ = pendulosity in g · cm
- $T_c(s)$ = Laplace transform of capture torque in dyn · cm
- $T_e(s)$ = Laplace transform of error torque in dyn · cm All other symbols have the same definition as in Eq A1. All effects of the model equation error coefficients have been neglected.

Fig A1
Block Diagram for Open-Loop Operation

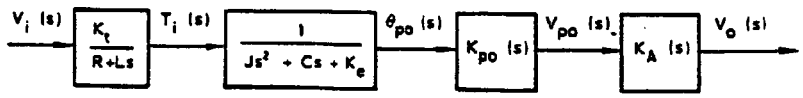

49
Appendix B
Static Multipoint Test

B1. Introduction

A short discussion on the static multipoint test is presented herewith with emphasis on a suggested data reduction procedure. The procedure is based on the method of least squares. It gives a best estimate of each of the accelerometer performance coefficients, the uncertainties of these coefficients, and it provides a criterion for determining if a coefficient is statistically significant.

B2. Model Equation

The model equation represents the response of the accelerometer to applied accelerations along and normal to the input axis. The following model equation is assumed in the analysis:

$$A_{ind} = \frac{E_0}{K_1} = K_0 + a_i + K_2 a_i^2 + K_3 a_i^3 + \delta_o a_p$$
$$- \delta_p a_o + K_{ip} a_i a_p + K_{io} a_i a_o \quad (Eq\ B1)$$

where
$A_{ind}$ = acceleration indicated by the ac where
- $A_{ind}$ = acceleration indicated by the accelerometer in $g$
- $E$ = accelerometer output in output units
- $a_i, a_p, a_o$ = applied acceleration components along the positive input, pendulous, and output references axes, respectively in $g$
- $K_0$ = bias in $g$
- $K_1$ = scale factor in output units/$g$
- $K_2$ = second-order nonlinearity coefficient in $g/g^2$
- $K_3$ = third-order nonlinearity coefficient in $g/g^3$
- $\delta_o, \delta_p$ = misalignments of the input axis with respect to the input reference axis about the output reference and pendulous reference axes, respectively in radians
- $K_{ip}, K_{io}$ = cross-coupling coefficients in $(g/g)/$ cross $g$ The misalignment angles include angular errors of the mounting fixture, dividing head errors, and errors in mounting as well as misalignment of the input axis with respect to the input reference axis. There is no way of distinguishing between a misalignment and a linear cross axis sensitivity.

Some of the above terms may be deleted or others added as appropriate for the typ of accelerometer and its applications. Only a sufficient number of terms should be used that will adequately describe the response of the accelerometer.

B3. Test Procedure — Mounting Position 1

B3.1 Mounting Position 1. With the axis of the dividing head in a horizontal position and the head set at its 0° position, mount the accelerometer so that its output reference axis is parallel to the axis of the dividing head, the

Fig A2
Block Diagram for Closed-Loop Operation

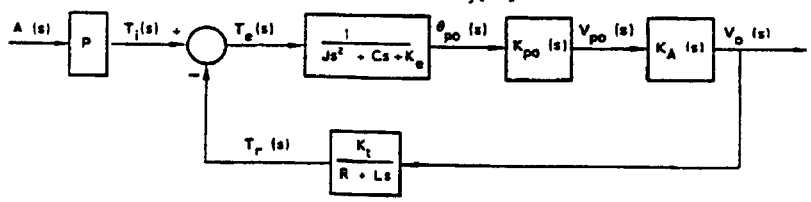

input reference axis is horizontal, the positive pendulous reference axis points upward, and the positive input reference axis points upward when the head is rotated to the 90° position.

B3.2 Data Taking — Mounting Position 1. At each head angle $\theta = 0°, \theta_n, 2\theta_n, \cdots, k\theta_n, \cdots, (n-1)\theta_n$, take and record several measurements of the accelerometer output $E_{kp}$, where $\theta_n = 360/n$, $n$ and $k$ are integers, and $0 \leq k \leq n-1$. The number $n$ of head angles at which measurements of accelerometer output are to be made is based on statistical considerations. In general, $n$ should be at least equal to twice the number of model equation coefficients to be determined. Though it is necessary to have equally spaced head angles, the specified sequence need not be in numerical order.

It is quite possible to have occasional "wild" data points in a series of readings which may be due to operator errors in recording the data (such as transposition of numbers), or they may be due to a power line or other unusual transient, or they may be true members of the statistical population. For example, in a Gaussian distribution of the errors around the mean, one may expect three readings out of a 1000 to have an error greater than three times the standard deviation from the mean. Since the usual sample is only three to five readings at each head angle, a single "wild" point could cause a large error in the estimate of the model equation coefficients. In order to reduce the possibility of a large error in the estimated values of the coefficients, it is quite common to use the median value at each head angle. However, if the number of readings $q$ per head angle multiplied by the number of head angle positions $n$ is large compared to the number of unknown coefficients, a single "wild" point will have very little effect on the estimated value of the coefficients. The equations derived below are intended for use only with the median reading, or the mean of the readings at each head angle. If all the data at each head angle are used, it is important that exactly the same number of readings be taken at every head angle and that the equations below be modified appropriately.

B3.3 Fourier Analysis — Mounting Position 1. In the above mounting position, the acceleration components in units of the local gravity vector $g$ as functions of table angle are $$a_i = \sin k\theta_n$$
$$a_p = \cos k\theta_n$$
$$a_o = 0 \qquad \text{(Eq B2)}$$

where $k\theta_n$ = dividing head angle, in degrees, $k = 0, 1, 2, \cdots, n-1$

It should be noted that $\delta_p$ and $K_{io}$ of the model equation B1 are not exercised in mounting position 1, since $a_o = 0$.

Substituting Eqs B2 in Eq B1 and using well-known trigonometric identities and small-angle approximations, Eq B1 may be expressed by the following Fourier series:

$$\bar{E}_{kp} = a_0 + a_1 \sin k\theta_n + a_2 \sin 2k\theta_n + a_3 \sin 3k\theta_n + \beta_1 \cos k\theta_n + \beta_2 \cos 2k\theta_n$$

(Eq B3)

where $\bar{E}_{kp}$ = expected value of the accelerometer output at head angle $\theta = k\theta_n$ $$a_0 = K_1 \left(K_0 + \frac{1}{2} K_2\right)$$
$$a_1 = K_1 \left(1 + \frac{3}{4} K_3\right)$$
$$a_2 = \frac{1}{2} K_1 K_{ip} \qquad \text{(Eq B4)}$$
$$a_3 = -\frac{1}{4} K_1 K_3$$
$$\beta_1 = K_1 \delta_o$$
$$\beta_2 = -\frac{1}{2} K_1 K_2$$

Those values of the Fourier coefficients which will best fit all the data points are determined by the method of least squares. The residual (the measured value less the expected or best fit value of the output) at head angle $\theta = k\theta_n$ is $$r_k = E_{kp}^* - (a_0 + a_1 \sin k\theta_n + \beta_1 \sin 2k\theta_n + a_3 \sin 3k\theta_n + \beta_1 \cos k\theta_n + \beta_2 \cos 2k\theta_n)$$

(Eq B5)

where $r_k = E_{kp}^* - \bar{E}_{kp}$ = residual at head angle $k\theta_n$, in output units $E_{kp}$ = measured value of accelerometer output at head angle $k\theta_n$, in output units The sum of the squares f the residuals is $$\sum_{k=0}^{n-1} r_k^2 = \sum_{k=0}^{n-1} \left[ E_{kp} - (a_0 + a_1 \sin k\theta_n + a_2 \sin 2k\theta_n + a_3 \sin 3k\theta_n + \beta_1 \cos k\theta_n + \beta_2 \cos 2k\theta_n) \right]^2 \quad \text{(Eq B6)}$$

In the method of least squares, the sum of the squares of the residuals is minimized. This is done by taking the partial derivative of Eq B6 with respect to each of the unknown Fourier coefficients, in turn, and setting each derivative equal to zero. Six normal equations are thus obtained from which the six Fourier coefficients are determined. Because the head angles are equally spaced, most of the sums that appear in the normal equations are equal to zero. Solving the normal equations for the Fourier coefficients, it is found that $$a_0 = \frac{1}{n} \sum_{k=0}^{n-1} E_{kp}$$

$$a_1 = \frac{2}{n} \sum_{k=0}^{n-1} E_{kp} \sin k\theta_n$$

$$a_2 = \frac{2}{n} \sum_{k=0}^{n-1} E_{kp} \sin 2k\theta_n$$

$$a_3 = \frac{2}{n} \sum_{k=0}^{n-1} E_{kp} \sin 3k\theta_n \quad \text{(Eq B7)}$$

$$\beta_1 = \frac{2}{n} \sum_{k=0}^{n-1} E_{kp} \cos k\theta_n$$

$$\beta_2 = \frac{2}{n} \sum_{k=0}^{n-1} E_{kp} \cos 2k\theta_n$$

B3.4 Model Equation Coefficients — Mounting Position 1. Solve Eqs B4 for the best fit values of the model equation coefficients in terms of the Fourier coefficients.

$$K_1 = a_1 + 3a_3$$
$$K_0 = (a_0 + \beta_2)/K_1$$
$$K_2 = -2\beta_2/K_1$$
$$K_3 = -4a_3/K_1 \quad \text{(Eq B8)}$$
$$\delta_o = \beta_1/K_1$$
$$K_{ip} = 2a_2/K_1$$

If desired for convenience, an approximat value of $K_1$ may be used n the right-hand side of Eqs B8 with ut any significant l ss of accuracy.

B3.5 Standard Deviation of Residuals — Mounting Position 1. The standard deviation of the residuals is a measure of the fit of the Fourier series, Eq B3, to the test data. The unbiased estimate of the standard deviation f the residuals for mounting position 1 is $$\sigma_r = \sqrt{\frac{\sum_{k=0}^{n-1} r_k^2}{n-m}} \quad \text{(Eq B9)}$$

where
$\sigma_r$ = unbiased estimate of the standard deviation of the residuals in output units
$n$ = number of head angle positions
$m$ = number of Fourier coefficients From Eq B3 it is seen that $m = 6$ for the assumed model equation. The sum of the squares of the residuals in Eq B9 can be determined from Eq B6 which may be put int the following more convenient form:

$$\sum_{k=0}^{n-1} r_k^2 = \sum_{k=0}^{n-1} E_{kp}^2 - \frac{n}{2}(2a_0^2 + a_1^2 + a_2^2 + a_3^2 + \beta_1^2 + \beta_2^2) \quad \text{(Eq B10)}$$

Eq B7 may be substituted in Eq B10 if it is found to be more convenient for programming the data reduction.

B3.6 Uncertainties of Fourier Coefficients — Mounting Position 1. The unbiased estimates of the uncertainty of the Fourier coefficient $a_0$ is $$\delta(a_0) = \sigma_r \sqrt{\frac{1}{n}} \quad \text{(Eq B11)}$$

The unbiased estimate of the uncertainty of each of the other Fourier coefficients is $$\delta(a_j) = \delta(\beta_j) = \sigma_r \sqrt{\frac{2}{n}}, \quad j = 1, 2, \text{ or } 3 \quad \text{(Eq B12)}$$

For some accelerometers, the Fourier coefficients due to the nonlinear or cross acceleration terms, r both, may be too small to measure by a static multipoint test in a 1-g field, and the values obtained are largely the result of n ise in the measurement. Using the Student's $t$ statistic and $n-m \geq 8$, we can be approximately 95 percent confident that a Fourier coefficient is not significantly different from zero if its absolute value is smaller than twice the uncertainty obtained in Eq B11 or B12, whichever is appropriate. It is obvious from Eqs B7 that setting one Fourier coefficient equal to zero does not affect the value of the others. However, setting a Fourier coefficient equal to zero does affect Eq B8 through B12 because of the increase in the residuals and the decrease in $m$. New values of the uncertainties must be calculated if one or more Fourier coefficients are set equal to zero because they are not significantly different from zero.

B3.7 Uncertainties of Model Equation Coefficients — Mounting Position 1. The uncertainties of the model equation coefficients may be expressed in terms of the uncertainties of the best estimate of the Fourier coefficients. Based on Eqs B8, it can be shown that $$\hat{\sigma}(K_0) = \frac{1}{K_1}\left[\hat{\sigma}^2(a_0) + \hat{\sigma}^2(\beta_2)\right]^{\frac{1}{2}} = \frac{\hat{\sigma}_r}{K_1}\left[\frac{2}{n}\right]^{\frac{1}{2}}$$

$$\hat{\sigma}(K_1) = \left[\hat{\sigma}^2(a_1) + 9\hat{\sigma}^2(a_3)\right]^{\frac{1}{2}} = \hat{\sigma}_r\left[\frac{20}{n}\right]^{\frac{1}{2}}$$

$$\hat{\sigma}(K_2) = K_1^2\,\hat{\sigma}(\beta_2) = \frac{\hat{\sigma}_r}{K_1}\left[\frac{8}{n}\right]^{\frac{1}{2}} \qquad \text{(Eq B13)}$$

$$\hat{\sigma}(K_3) = \frac{4}{K_1}\hat{\sigma}(\beta_3) = \frac{\hat{\sigma}_r}{K_1}\left[\frac{32}{n}\right]^{\frac{1}{2}}$$

$$\hat{\sigma}(\sigma_0) = \frac{1}{K_1}\hat{\sigma}(\beta_1) = \frac{\hat{\sigma}_r}{K_1}\left[\frac{2}{n}\right]^{\frac{1}{2}}$$

$$\hat{\sigma}(K_{ip}) = \frac{2}{K_1}\hat{\sigma}(a_2) = \frac{\hat{\sigma}_r}{K_1}\left[\frac{8}{n}\right]^{\frac{1}{2}}$$

If any of the Fourier coefficients in Eq B3 are zero, Eqs B13 should be modified accordingly.

B4. Test Procedure — Mounting Position 2

B4.1 Mounting Position 2. With the axis of the dividing head in a horizontal position and the head set at its 0° position, mount the accel rometer s that its pendulous reference axis is parallel to the axis f the dividing head, the input reference axis is horizontal, the positive output reference axis points downward, and the positive input reference axis points upward when the head is rotated to the 90° position.

B4.2 Data Taking — Mounting Position 2. At each head angle $\theta = 0°, \theta_n, 2\theta_n, \cdots, k\theta_n, \cdots, (n-1)\theta_n$, take and record several measurements of the accelerometer output $E_{ko}$, where $\theta_n = 360/n$, $n$ and $k$ are integers, and $0 \leq k \leq n-1$. The value of $n$ must be the same as that used in mounting position 1.

B4.3 Fourier Analysis — Mounting Position 2. In this mounting position, the acceleration components in units of the local gravity v ctor $g$ as functions of table angle are $$a_i = \sin k\theta_n$$
$$a_p = 0 \qquad \text{(Eq B14)}$$
$$a_o = -\cos k\theta_n$$

It should be noted that $\delta_o$ and $K_{ip}$ of Eq 1 are not exercised in mounting position 2 since $a_p = 0$.

Substituting Eqs B14 in Eq B1, we obtain the following Fourier series:

$$\bar{E}_{ko} = a_0 + a_1 \sin k\theta_n + a_2 \sin 2k\theta_n + a_3 \sin 3k\theta_n + \beta_1 \cos k\theta_n + \beta_2 \cos 2k\theta_n \qquad \text{(Eq B15)}$$

where
$\bar{E}_{ko}$ = expected value of the accelerometer output at head angle $\theta = k\theta_n$ $$a_0 = K_1\left(K_0 + \frac{1}{2}K_2\right)$$
$$a_1 = K_1\left(1 + \frac{3}{4}K_3\right)$$
$$a_2 = -\frac{1}{2}K_1 K_{io} \qquad \text{(Eq B16)}$$
$$a_3 = -\frac{1}{4}K_1 K_3$$
$$\beta_1 = K_1\,\delta_p$$
$$\beta_2 = -\frac{1}{2}K_1 K_2$$

Note that Fourier coefficients of Eqs B15 and B16 are, in general, different from those of Eq B3 and B4 which are derived from data taken in mounting position 1.

Eqs B5 through B7 hold for mounting position 2 except that the subscripts "p" and "o" should be interchanged wherever they appear.

B4.4 Model Equation Coefficients — Mounting Position 2.

Solve Eqs B16 for the best fit values of the model equation coefficients in terms of the Fourier coefficients which are derived from data taken in mounting position 2.

$$K_1 = a_1 + 3a_3$$
$$K_0 = (a_0 + \beta_2)/K_1$$
$$K_2 = -2\beta_2/K_1$$
$$K_3 = -4a_3/K_1$$
$$\delta_p = \beta_1/K_1$$
$$K_{io} = -2a_2/K_1$$

(Eq B17)

If desired for convenience, an approximate value of $K_1$ may be used on the right-hand side of Eqs B17 without any significant loss of accuracy.

B4.5 Uncertainties of Model Equation Coefficients — Mounting Position 2.

The uncertainties of the model equation coefficients determined from mounting position 2 may be found by use of Eq B9 through B13 except that subscripts "p" and "o" should be interchanged wherever they appear.

B5. Best Estimate of Model Equation Coefficients

The best estimate for each of the model equation coefficients $K_0$, $K_1$, $K_2$, and $K_3$ is the average of those determined from the two mounting positions. For example, the best estimate of $K_2$ is $$\bar{K}_2 = \frac{1}{2}(K_2 + K'_2)$$

where
$\bar{K}_2$ = average value of $K_2$
$K_2$ = value of $K_2$ determined from position 1
$K'_2$ = value of $K_2$ determined from position 2

(Eq B18)

The uncertainty of each of these coefficients is very nearly equal to the square root of one half the sum of the squares of the uncertainties determined in the two mounting positions if $n \geq 12$. For example, the uncertainty of $K_2$ is $$\hat{\sigma}(\bar{K}_2) \approx \left[\frac{\sigma^2}{4}(K_2) + \frac{\sigma^2}{4}(K'_2)\right]^{\frac{1}{2}}$$

(Eq B19)

The model equation coefficients $\delta_o$ and $K_{ip}$ and their uncertainties are determined only in mounting position 1. The coefficients $\delta_p$ and $K_{io}$ and their uncertainties are determined only in mounting position 2. Therefore, no averaging process is involved for these four coefficients.

As previously stated, the standard deviation of the residuals is a measure of the fit of the Fourier series to the test data. The best estimate of the standard deviation of the residuals (expressed in units of $g$ rather than output units) for the best fit model equation, as determined by the above procedures using the two mounting positions, is very nearly equal to $$\bar{\hat{\sigma}}_r \approx \frac{4}{K_1}\left[\frac{\hat{\sigma}_r^2 + \hat{\sigma}_r'^2}{2}\right]^{\frac{1}{2}}$$

(Eq B20)

What is claimed is:

1. A method of calibrating a plurality of seismic sensors, each sensor having an axis of sensitivity, comprising:

positioning the sensors with each sensor positioned with its axis of sensitivity in a different spatial direction;

rotating the sensors;

measuring one or more output signals from the sensors;

processing the one or more output signals from the sensors; and storing one or more calibration coefficients.

2. The method of claim 1, wherein the sensors comprise micro-machined accelerometers.

3. The method of claim 1, wherein coupling the sensors with each sensor positioned with its axis of sensitivity in a different spatial direction comprises, coupling the sensors with the axes of sensitivity in:

a first direction;

a second direction; and a third direction.

4. The method of claim 1, wherein rotating the sensors comprises, rotating the sensors about the x-axis, the y-axis and the z-axis.

5. The method of claim 1, wherein measuring one or more output signals from the sensors comprises, measuring the output signals from the sensors at one or more angles of rotation.

6. The method of claim 1, wherein processing the output signals from the sensors comprise, calculating one or more calibration coefficients from the measured output signals of the sensors.

7. The method of claim 1, wherein each sensor further includes a corresponding ASIC having a local non-volatile memory; and wherein storing one or more calibration coefficients includes storing the corresponding calibration coefficients to the corresponding local non-volatile memories.

8. The method of claim 1, wherein storing one or more calibration coefficients includes storing the corresponding calibration coefficients to a database external to the sensors.

9. The method of claim 1, wherein coupling, rotating, measuring, and processing are provided in accordance with the Institute of Electrical and Electronic Engineers Specification IEEE 337-1972 for the IEEE Standard Specification Format Guide and Test Procedure for Linear, Single-Axis, Pendulous, Analog Torque Balance Accelerometer.

* * * * *